(12) United States Patent
Choi et al.

(10) Patent No.: US 7,913,681 B2
(45) Date of Patent: *Mar. 29, 2011

(54) FLOOR ASSEMBLY FOR GRILL

(75) Inventors: Daniel S. Choi, Vernon Hills, IL (US);
Adrian A. Bruno, Rolling Meadows, IL (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/754,718

(22) Filed: May 29, 2007

(65) Prior Publication Data

US 2007/0261691 A1 Nov. 15, 2007

Related U.S. Application Data

(63) Continuation of application No. 10/646,499, filed on Aug. 22, 2003, now abandoned, which is a continuation-in-part of application No. 09/927,897, filed on Aug. 10, 2001, now Pat. No. 6,739,558.

(51) Int. Cl.
*F24B 3/00* (2006.01)

(52) U.S. Cl. ......... 126/25 R; 126/30; 126/9 R; 126/9 B; 126/39 B; 248/129

(58) Field of Classification Search ............... 126/25 R, 126/30, 9 R, 9 B, 40, 39 B; 248/129, 175, 248/235, 239, 240, 240.3, 241, 245, 249, 250

See application file for complete search history.

(56) References Cited

U.S. PATENT DOCUMENTS

| 3,766,863 | A | | 10/1973 | Swick, Jr. et al. | |
|---|---|---|---|---|---|
| 3,766,863 | A | * | 10/1973 | Swick et al. | 108/188 |
| 4,601,247 | A | | 7/1986 | Welch et al. | |
| 4,601,247 | A | * | 7/1986 | Welch et al. | 108/152 |
| 4,666,117 | A | * | 5/1987 | Taft | 248/243 |
| 4,790,707 | A | * | 12/1988 | Magretta et al. | 414/276 |
| 4,819,901 | A | * | 4/1989 | McDonald | 248/250 |
| 4,862,792 | A | | 9/1989 | Lerma, Jr. | |
| 4,964,350 | A | * | 10/1990 | Kolvites et al. | 108/110 |
| 5,941,229 | A | | 8/1999 | Schlosser et al. | |
| 5,941,229 | A | * | 8/1999 | Schlosser et al. | 126/41 R |
| 6,132,158 | A | * | 10/2000 | Pfeiffer et al. | 414/276 |
| 6,474,327 | B1 | | 11/2002 | Bossler | |
| 6,739,558 | B2 | * | 5/2004 | Stephen et al. | 248/129 |

* cited by examiner

*Primary Examiner* — Alfred Basichas
(74) *Attorney, Agent, or Firm* — David I. Roche; Daniel A. Tallitsch; Baker & McKenzie LLP

(57) ABSTRACT

The present invention provides a shelf 300 for a barbecue grill frame assembly 302 of a barbecue grill. The shelf 300 has a perimeter that is cooperatively dimensioned with the interior space of the barbecue grill frame assembly 302 such that the shelf 300 is positioned within the interior space. The securing member 308 secures the shelf 300 to the barbecue grill frame assembly 302 in a first position. The securing member 308 adjusts to a second position to detach the shelf 300 from the barbecue grill frame assembly 302.

20 Claims, 16 Drawing Sheets

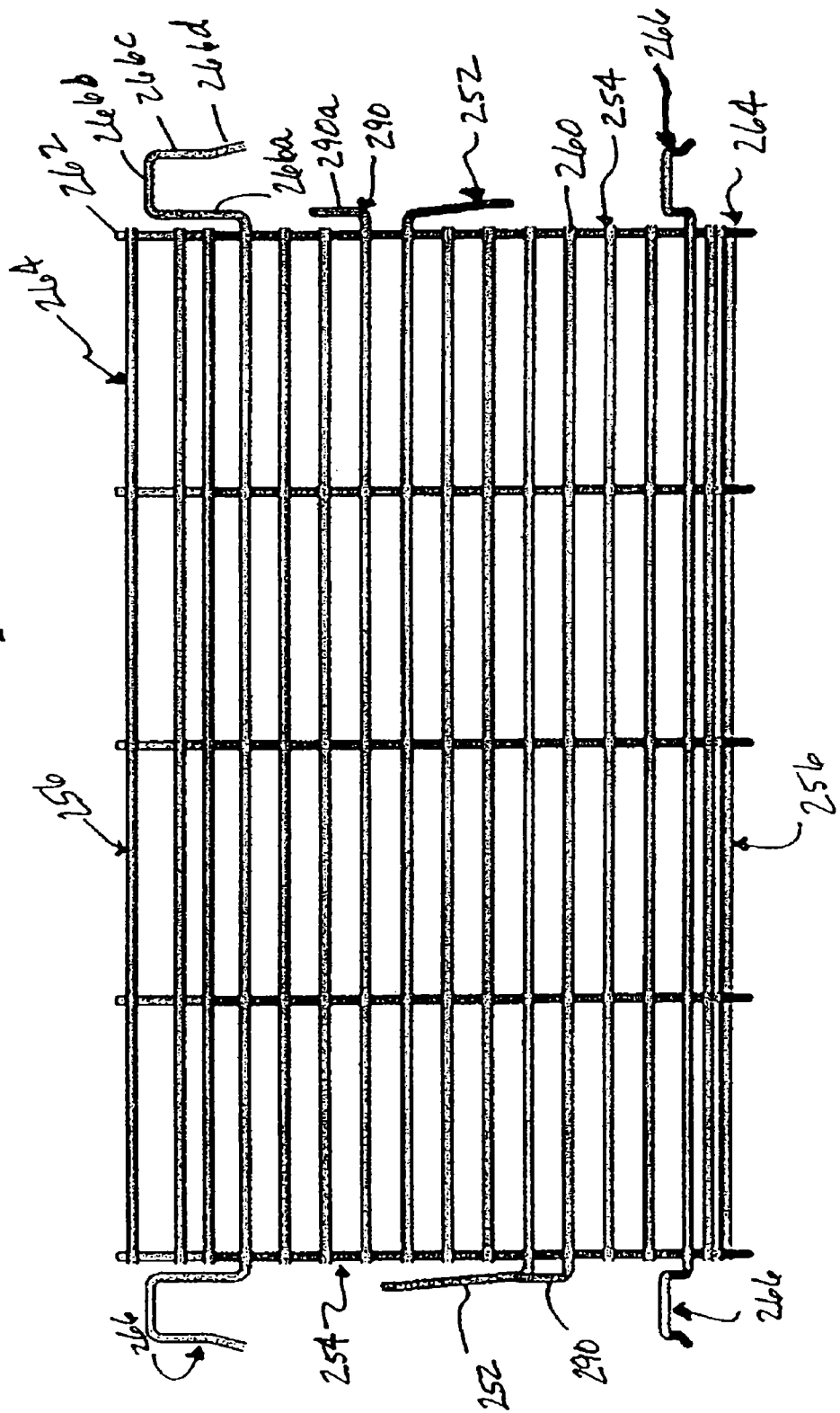

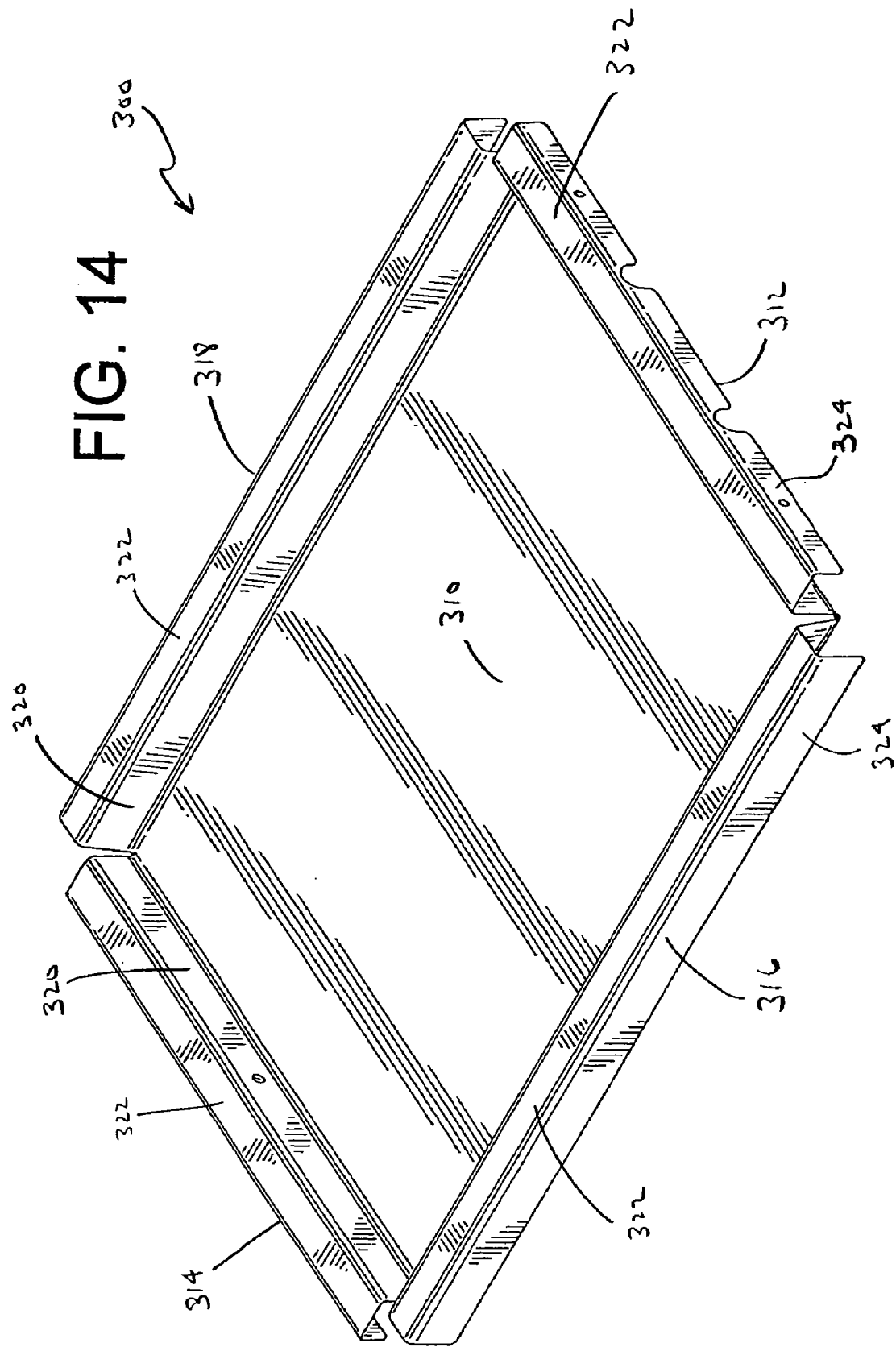

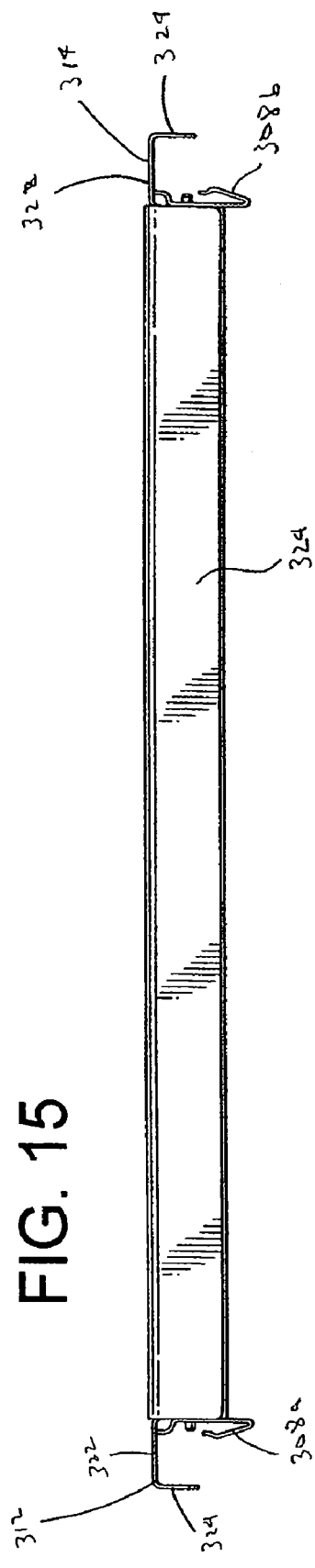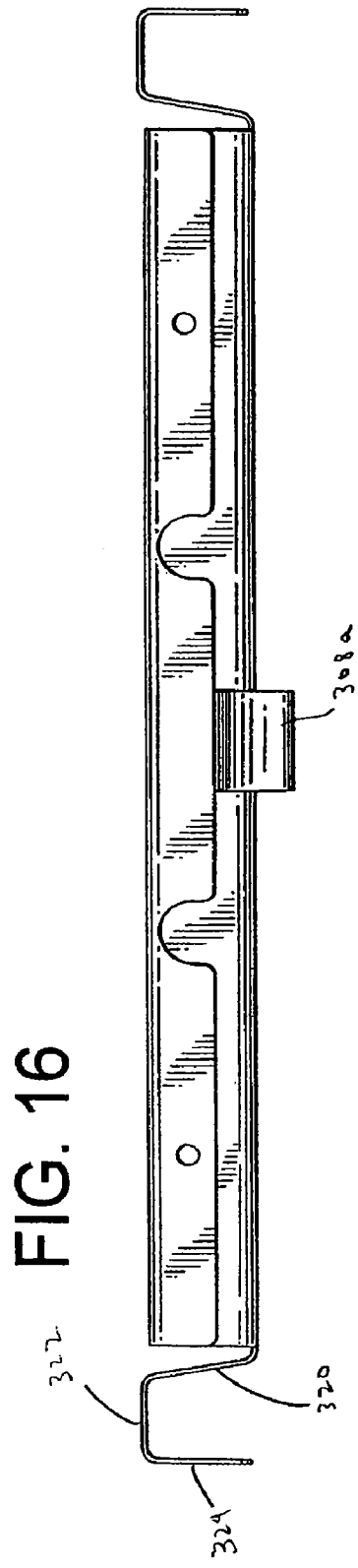

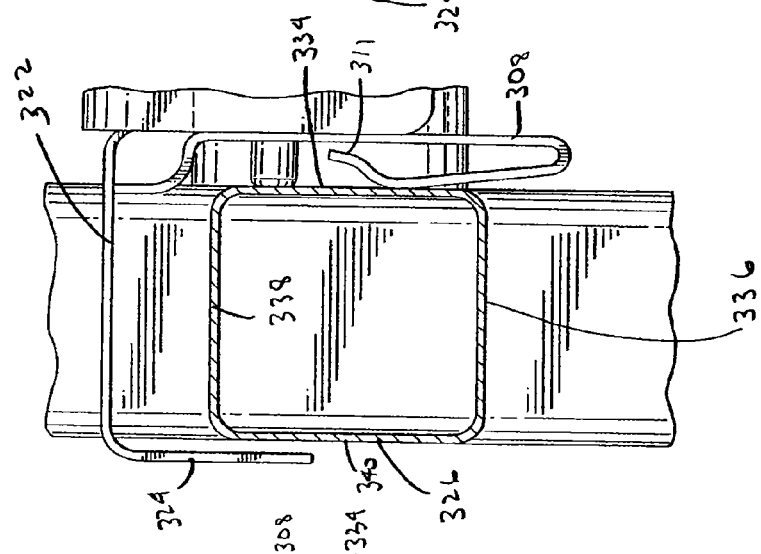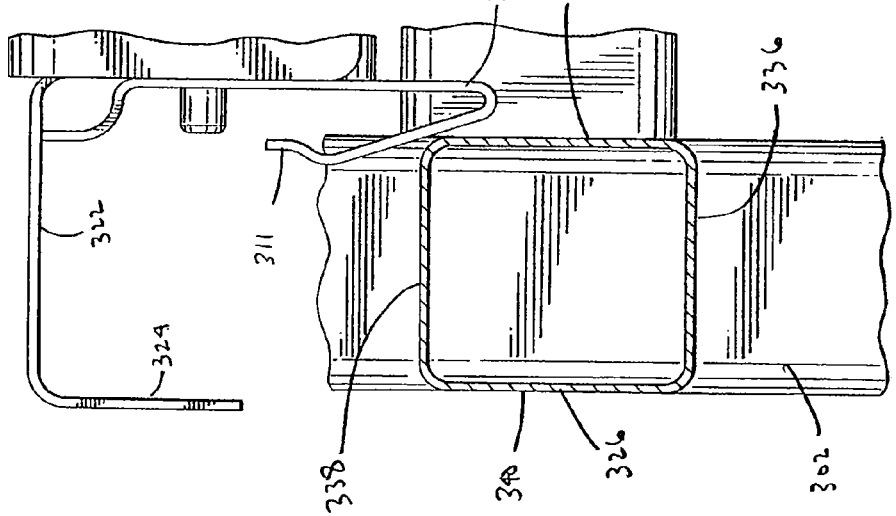

FLOOR ASSEMBLY FOR GRILL

CROSS-REFERENCE TO RELATED APPLICATIONS

This application is a continuation of U.S. patent application Ser. No. 10/646,499, filed Aug. 22, 2003 now abandoned, which is a continuation-in-part of U.S. patent application Ser. No. 09/927,897, filed Aug. 10, 2001 (issued as U.S. Pat. No. 6,739,558). U.S. patent application Ser. Nos. 09/927,987 and 10/646,499 are hereby incorporated by reference, and made a part hereof.

FEDERALLY SPONSORED RESEARCH OR DEVELOPMENT

Not Applicable.

TECHNICAL FIELD

The present invention relates to a grill assembly with a shelf component. More specifically, the present invention relates to a floor assembly for a barbecue grill.

BACKGROUND OF THE INVENTION

As the popularity of barbecue grills has increased, manufacturers have employed many types of shelves or trays for use in the frame supporting the barbecue grill. Generally, the tray is connected to a lower portion of the frame. Typically, the trays are connected to the extremities of the lower portion with fasteners and hardware such as nuts and bolts. The tray can be configured to provide support for other elements, including a fuel tank.

A concern with trays of this type is the difficulty in properly connecting the tray to the lower portion of the frame. A second concern is providing sufficient structural integrity of the tray and frame. A related concern is a possible loss of structural integrity due to the multiplicity of fasteners used to connect the tray to the lower portion of the frame.

An example of a gas barbecue grill having a tray design susceptible of such concerns identified above is U.S. Pat. No. 5,579,755 issued to Johnston. As shown in FIGS. 1 and 2 therein, the barbecue grill is supported by a complex frame with a lower portion. The tray is connected to vertical supports positioned at the extremities of the lower portion of the frame. A combination of threaded fasteners and nuts are used to connect the tray to the vertical supports. Prior to connecting the tray to the vertical supports, the lower portion of the frame lacks any cross-member support.

Due to the thin-wall construction of the tray and the use of threaded fasteners that are susceptible to loosen over time, the frame may naturally experience a reduction in structural integrity.

Another example of a barbecue grill design with the concerns identified above is U.S. Pat. No. 5,072,718 issued to Seal. Referring to FIG. 2 therein, the barbecue grill is supported by a frame comprising a plurality of bent tubular members and a tray. The tray is connected to vertical supports positioned at the extremities of the frame. A combination of threaded fasteners and nuts are used to connect the tray to the vertical supports. Like the '755 patent to Johnston, prior to connecting the tray to the vertical supports, the lower portion of the frame lacks any cross-member support.

Therefore, there is a definite need for a shelf for use in a barbecue grill assembly that is durable and provides an enhanced degree of structural integrity to the frame supporting the barbecue grill. In addition, there is a need for a shelf that can be simply and reliably connected to the frame without the use of fasteners.

The present invention is provided to solve these and other problems.

SUMMARY OF THE INVENTION

The present invention relates to a shelf for a barbecue grill frame assembly. In one embodiment the barbecue grill frame assembly comprises an upper frame assembly and a lower frame assembly. The upper assembly is adapted to receive a cooking chamber. The lower assembly has a shelf and a plurality of lower frame members. The lower frame members define an interior space. Alternatively, the barbecue grill assembly has a single frame assembly with a plurality of frame members defining an interior space.

According to one aspect of the present invention, the shelf is a rigid structure with a perimeter cooperatively dimensioned with the interior space such that the shelf can be positioned within the interior space.

According to another aspect of the present invention, at least one of the lower frame members has an aperture. The shelf has at least one pin positioned on an edge of the shelf. The pin is cooperatively dimensioned with the aperture such that the pin is removably received by the aperture. When the shelf and the frame member are connected in this manner, the lower assembly has a rigid and stable construction thereby increasing the structural rigidity of the barbecue grill assembly.

Because the pin is adapted to be removably received by the aperture, the shelf can be quickly and easily disengaged from the lower frame member. As a result, the packaging and storage options for the grill assembly are increased.

According to another aspect of another embodiment of the present invention, the shelf has at least one securing member and at least one supporting member. The securing member is adapted to move between a first position, wherein the securing member engages an inner portion of the lower frame member, and a second position, wherein the securing member engages a bottom portion of the lower frame member. In the second position, the supporting member engages at least an upper portion of the lower frame member.

The first position is a transitory position, whereas the second position is a stable position. In the second position, the shelf is connected to the lower frame member thereby securing the lower assembly. As a result, the structural rigidity of both the lower assembly and the barbecue grill assembly is increased.

According to another aspect of another embodiment of the present invention, the shelf has at least one securing member, one supporting member, and one finger. In the first position, the finger slidingly engages an inner portion of the lower frame member. In the second portion, the finger engages the inner portion to prevent movement of the shelf with respect to the lower frame member.

According to another aspect of the present invention, a shelf is provided for a barbecue grill having a barbecue grill frame assembly. The shelf comprises a bottom wall, a first sidewall depending from the bottom wall, and a first quick release member secured to the first sidewall.

According to another aspect of another embodiment of the present invention, the first quick release member is moveable from a first position to a second position. In the first position the quick release member secures the shelf to the barbecue grill frame. In the second position the quick release member is configured to allow detachment of the shelf from the barbecue grill frame assembly.

According to another aspect of another embodiment of the present invention, the shelf also has a second sidewall depending from the bottom wall, and a second quick release member secured to the second sidewall. Like the first quick release member, the second quick release member secures the shelf to the barbecue grill frame assembly in a first position, and the second quick release member adjusts to a second position to allow detachment of the shelf from the barbecue grill frame assembly.

According to another aspect of another embodiment of the present invention, the shelf is secured to and removable from the barbecue grill frame assembly without additional hardware. In one embodiment, the first quick release member is a spring member.

According to another aspect of another embodiment of the present invention, the barbecue grill frame assembly has a plurality of leg members and a plurality of cross members extending therebetween. The quick release member of the shelf engages one of the cross members of the barbecue grill frame assembly to secure the shelf to the barbecue grill frame assembly.

According to another aspect of another embodiment of the present invention, a shelf is provided for a barbecue grill having a barbecue grill frame assembly. The frame assembly has a plurality of leg members and a plurality of cross members extending there between. The shelf comprises a bottom wall, a plurality of sidewalls depending from the bottom wall, and a first spring member secured to a first of the plurality of sidewalls. The sidewalls have an upstanding portion and a transverse portion. The first spring member secures the shelf to the barbecue grill frame assembly in a first position, and the first spring member adjusts to a second position to allow detachment of the shelf from the barbecue grill frame assembly.

According to another aspect of another embodiment of the present invention, a second spring member is secured to a second of the plurality of sidewalls. The second spring member provides additional securement for securing the shelf to the barbecue grill frame assembly when the second spring member is in a first position. The second spring member also adjusts to a second position to allow detachment of the shelf from the barbecue grill frame assembly.

According to another aspect of another embodiment of the present invention, the sidewalls of the shelf engage the cross members of the barbecue grill frame assembly. In one embodiment the transverse portion of the sidewalls of the shelf are positioned on an upper portion of the cross members of the barbecue grill frame assembly. In another embodiment, the sidewalls further have a downturned portion depending from the transverse portion. The downturned portion engages the cross member of the barbecue grill frame assembly.

According to another aspect of another embodiment of the present invention, a shelf is provided for a barbecue grill having a barbecue grill frame assembly. The shelf comprises a bottom wall and a quick release member depending from the shelf. The quick release member secures the shelf to the barbecue grill frame assembly in a first position. Additionally, the first quick release member adjusts to a second position to allow, detachment of the shelf from the barbecue grill frame assembly. In one embodiment the quick release member is a spring member.

According to another aspect of another embodiment of the present invention, the shelf also has a second quick release member depending from the shelf. The second quick release member secures another portion of the shelf to the barbecue grill frame assembly when the second quick release member is in a first position. Further, the second quick release member adjusts to a second position to allow detachment of the other portion of the shelf from the barbecue grill frame assembly.

According to another aspect of another embodiment of the present invention, a shelf is provided for a barbecue grill having a barbecue grill frame assembly. The barbecue grill frame assembly is formed from a plurality of leg members and a plurality of cross members extending therebetween and defining an interior space. In one embodiment the shelf comprises a bottom member and a plurality of sidewalls depending from the bottom wall. The sidewalls have a downturned portion. The shelf is fabricated to be generally positioned within the interior space of the frame assembly such that the downturned portion of opposing sidewalls engages opposing cross members, respectively, of the barbecue grill frame assembly to seat the shelf.

According to another aspect of another embodiment of the present invention, the shelf also has a flexible securing member depending therefrom to fixedly secure the shelf to the barbecue grill frame assembly. In one embodiment the securing member is adapted to move between a first position and a second position. In the second position the securing member slidingly engages a portion of an inner wall of the cross member of the barbecue grill frame assembly. In the first position the securing member lockingly engages a portion of a bottom wall of the cross member of the barbecue grill frame assembly. In a preferred embodiment the securing member is biased towards the first position.

According to another aspect of another embodiment of the present invention, the sidewalls of the shelf comprise a U-shaped member depending from the bottom member. In one embodiment each U-shaped member engages one of the cross-members of the barbecue grill frame assembly to seat the shelf on the barbecue grill frame assembly.

Other features and advantages of the invention will be apparent from the following specification taken in conjunction with the following drawings.

BRIEF DESCRIPTION OF THE DRAWINGS

FIG. 10 is a perspective view of a third shelf embodiment;

FIG. 14 is a top perspective view of the shelf of FIG. 12;

FIG. 15 is a front elevation view of the shelf of FIG. 12;

FIG. 16 is a side elevation view of the shelf of FIG. 12;

FIG. 19A is a partial front elevation view of the shelf of FIG. 12 prior to engagement with the barbecue grill assembly;

FIG. 19B is a partial front elevation view of the shelf of FIG. 12 during initial engagement with the barbecue grill assembly;

FIG. 19C is a partial front elevation view of the shelf of FIG. 12 in complete engagement with the barbecue grill assembly; and, FIG. 20 is a perspective view of another embodiment of the shelf of the present invention.

DETAILED DESCRIPTION OF THE INVENTION

Figure 1:
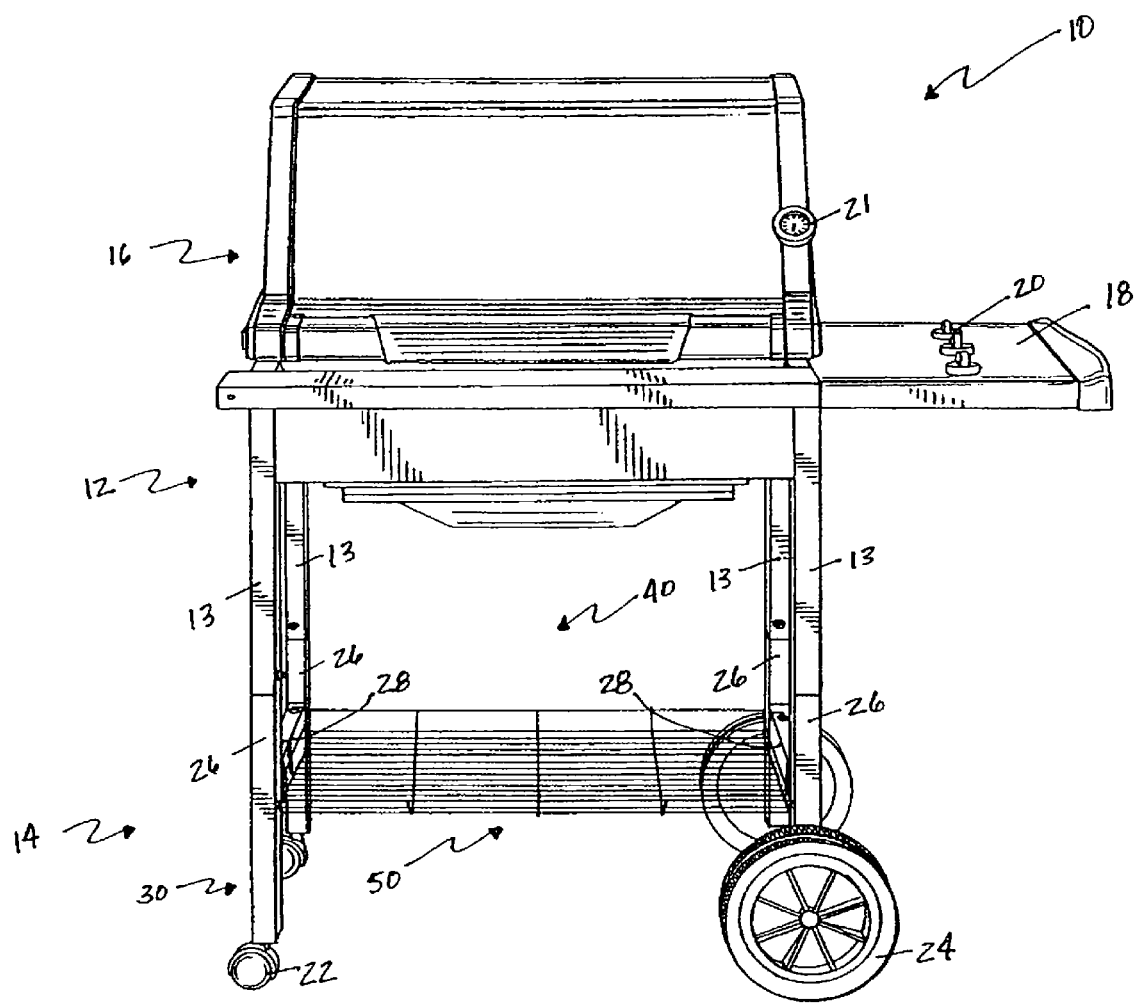
FIG. 1 is a front elevation view of a barbecue grill assembly including a shelf of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A barbecue grill assembly 10 is shown in FIG. 1. The barbecue grill assembly 10 comprises an upper frame assembly 12 and a lower frame assembly 14. The upper frame assembly 12 has a configuration sufficient to receive and/or support a cooking chamber or firebox 16. The upper frame assembly 12 is formed from a plurality of upper frame members 13. In addition, the barbecue grill assembly 10 can include a control panel 18, controls 20, temperature gauge 21, wheels 22, and casters 24.

Alternatively, the grill assembly 10 has a single frame assembly. This means that the grill assembly 10 does not have distinct upper and lower assemblies 12, 14. In this configuration, the single frame assembly is adapted to receive and/or support the cooking chamber 16. The single frame assembly is formed from a combination of frame members, including vertical, horizontal, and/or cross-members.

The barbecue grill assembly 10 made according to this invention includes a shelf 50 that is positioned within an interior space 40 of the frame or support structure. In the preferred embodiments shown in the figures, and used in the description herein, the support structure is made up of a number of frame members, including vertical members 26 and a form of cross-members 28, such as horizontal struts. The frame members may form a part of the upper assembly 12 and a part of the lower assembly 14. Alternatively, multiple frame members may by joined to form sub-assemblies that are joined together into the frame assembly. In an alternative embodiment, the interior space 40 may be defined by a plurality of spaced walls of a barbecue grill support cabinet.

The primary function of the shelf 50 is to substantially secure the lower frame assembly 14 in a grill assembly 10 having distinct upper and lower assemblies, and to substantially secure the frame assembly in a grill assembly 10 having a single assembly. In general terms, the shelf 50 secures members in a frame assembly in a generally rectangular configuration. With a grill assembly 10 that has distinct upper and lower assemblies 12, 14 that are spaced a distance apart, the cooking chamber 16 connects and secures the upper assembly 12 and the shelf 50 connects and secures the lower assembly 14. With a grill assembly 10 that has distinct left and right assemblies that are spaced a distance apart, the cooking chamber 16 connects and secures a portion of the right and left assemblies and the shelf 50 connects and secures the remaining portion of the right and left assemblies.

The lower frame assembly 14 is partially formed from at least one frame member, including lower vertical members 26 and lower cross-members 28. The lower assembly 14 includes a shelf 50 positioned within the interior space 40 of the frame structure formed by the assemblies 12, 14. Preferably, the members 26, 28 form two H-shaped sub-assemblies 30 spaced a distance apart to define an interior space 40 adapted to receive the shelf 50. The shelf 50 is cooperatively dimensioned with the interior space 40 and is adapted to be generally positioned within the interior space 40 to connect the members 26, 28 and secure the lower frame assembly 14.

Alternatively, the lower cross-members 28 are omitted and lower horizontal members (not shown) are included in the lower frame assembly 14. In this configuration, the members 28 and the horizontal members define the interior space 40 and the shelf 50 connects the vertical members 26 and the horizontal members.

Preferably, the members 13, 26, 28 have a tubular configuration. However, single-sided and two- or three-sided members are within the scope of the invention. Multi-sided members can have a variety of cross-sectional shapes, including but not limited to square, rectangular, L-shaped, U-shaped, or circular.

Figure 2:
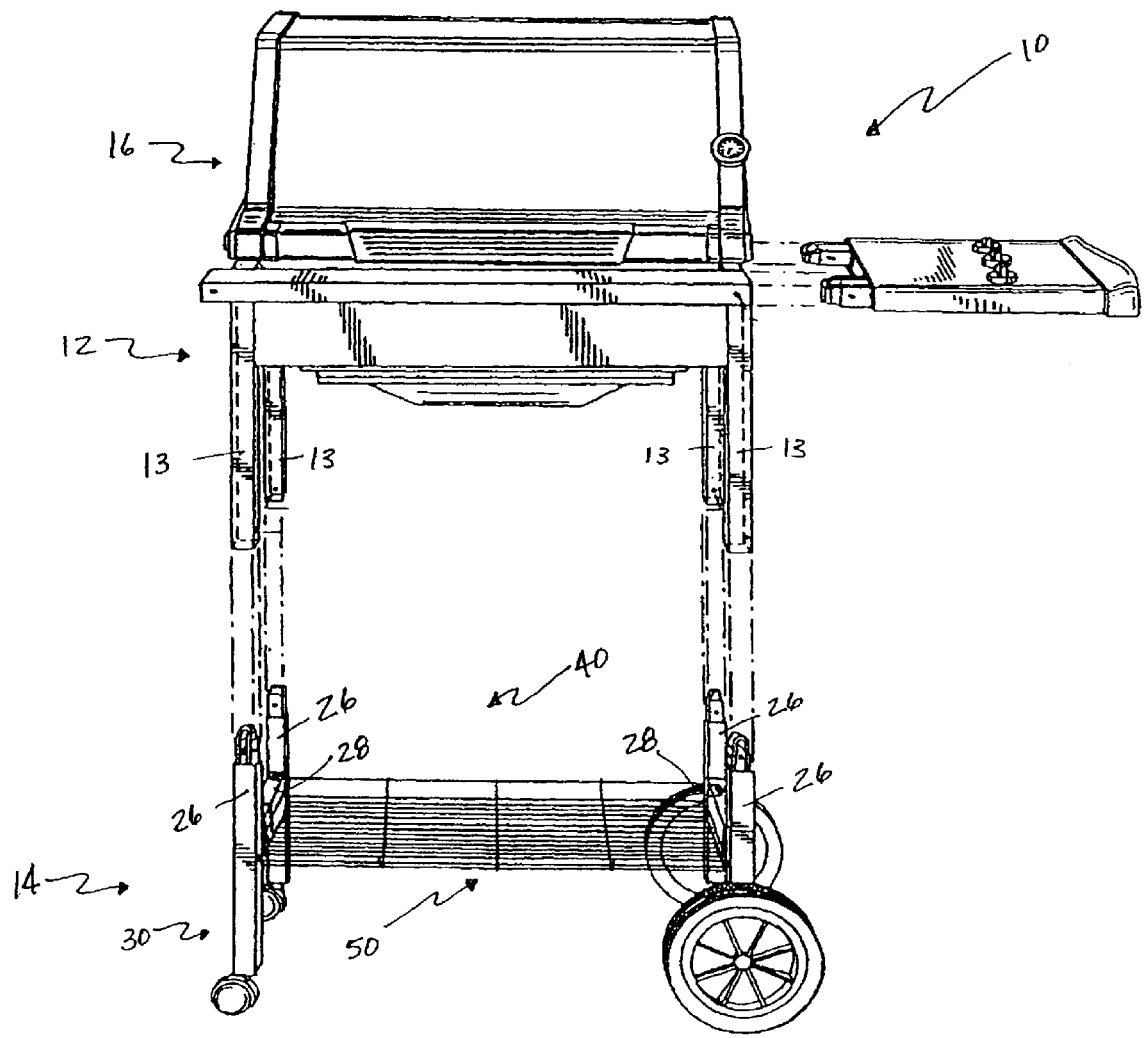
FIG. 2 is an exploded elevation view of the barbecue grill assembly of FIG. 1, showing the shelf connected to a lower frame assembly.

In general terms, the shelf 50 is a rigid structure that is positioned within the interior space 40 to join the members 26, 28 and form the lower assembly 14. Referring to FIG. 2, the shelf 50 provides structural integrity to the lower assembly 14 such that the lower assembly 14 can support the upper assembly 12 and the cooking chamber 16. In addition to providing structural support to the lower assembly 14, the shelf 50 is adapted to provide storage for the accessories used in connection with the grill assembly 10.

Figure 3:
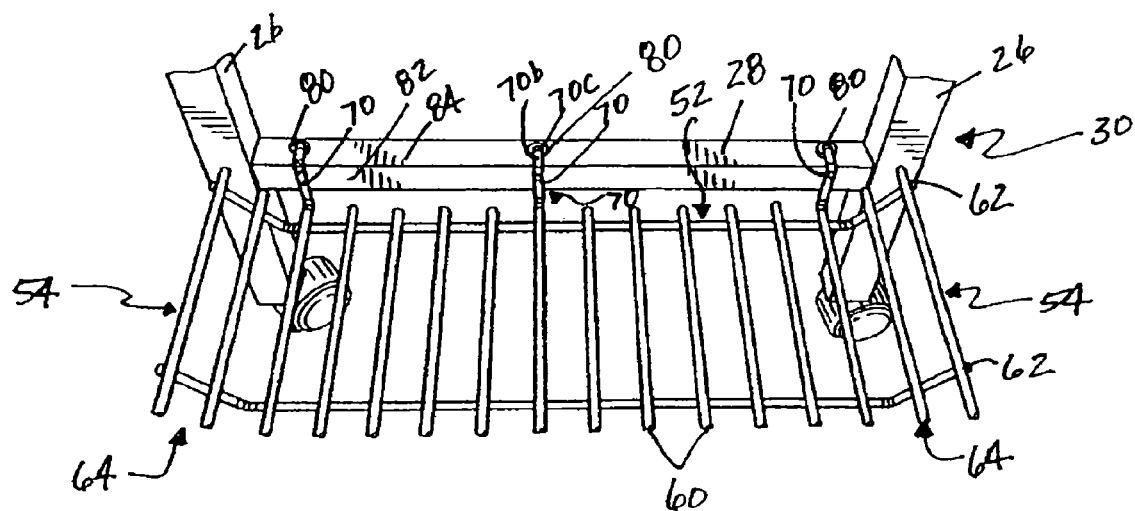
FIG. 3 is a partial elevation view of a first end of the shelf of FIG. 1.
Figure 4:
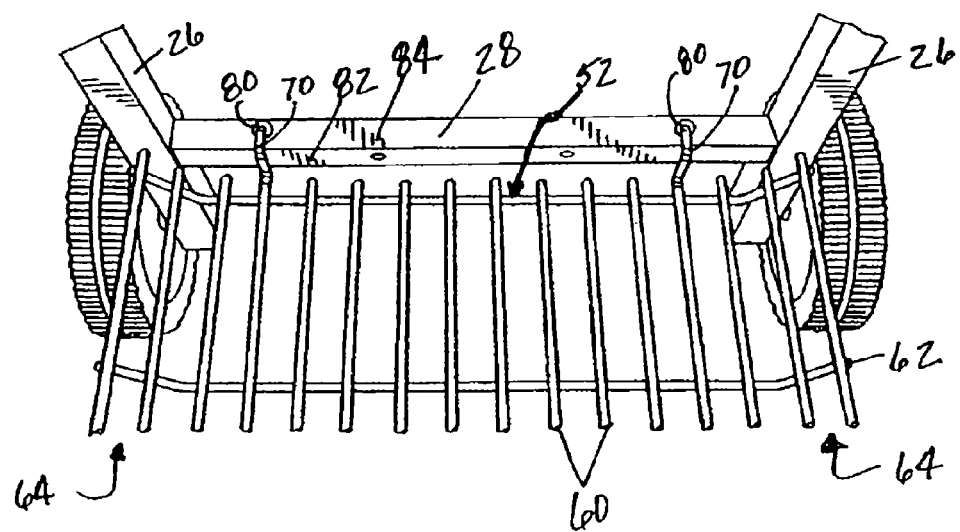
FIG. 4 is a partial elevation view of a second end of the shelf of FIG. 1.

As shown in FIGS. 3 and 4, the shelf 50 has a pair of opposed first edges 52 and a pair of opposed second edges 54. The edges 52, 54 form a perimeter P of the shelf 50. Although shown as having a generally rectangular configuration, the shelf 50 can have a variety of configurations, including square, elliptical or other curvilinear shapes.

Preferably, the shelf 50 is a wire rack formed from a plurality of welded rods. The shelf 50 comprises a plurality of longitudinal rods 60 and a plurality of transverse rods 62. Although the transverse rods 62 are shown positioned below the longitudinal rods 60, the orientation of the rods 60, 62 can be varied according to the design parameters of the shelf 50. A raised or angled portion 64 is positioned proximate the second edge 54. Alternatively, the raised portion 64 is positioned proximate the first edge 52. Because the shelf 50 is formed from a plurality of welded rods, the shelf 50 is stronger and more rigid than existing shelves having a thin-wall construction. Although shown as having a plurality of apertures or openings resulting from the intersection of the rods 62, 64, the shelf 50 can have a solid construction without apertures or openings.

The shelf 50 has at least one pin 70 on each of the first ends 52. Referring to FIGS. 3 and 4, the pin 70 extends from one of the longitudinal rods 60. Alternatively, the pin 70 extends from one of the transverse rods 62. Although five separate pins 70 are shown, the precise number of pins 70 varies with the design parameters of the shelf 50.

As shown in FIG. 3, the pin 70 has a first portion 70a, a second portion 70b, and a third portion 70c. The first portion 70a is generally a vertical segment of the pin 70. The second portion 70b is generally a horizontal segment of the pin 70. The third portion 70c is generally a vertical segment of the pin 70. The pin 70 is adapted to be removably received by an aperture 80 positioned in the cross-member 28. The pin 70 and the aperture 80 are in a mating relationship. Accordingly, the pin 70 and the aperture 80 are cooperatively dimensioned such that a portion of the pin 70 is received by the aperture 80. Also, the pin 70 and the aperture 80 are cooperatively positioned to facilitate the reception of the pin 70 by the aperture 80. The aperture 80 has an inner diameter that is adapted for frictional engagement with the pin 70. Alternatively, the aperture 80 is deformable for frictional engagement with the pin 70. In a preferred embodiment, the third portion 70c is removably received by the aperture 80. When the third portion 70c is received by the aperture 80, the second portion 70b engages a top wall 84 of the cross-member 28 and the first portion 70a engages an inner wall 82 of the cross-member 28. Alternatively, a bushing (not shown) is positioned within the aperture 80 wherein the bushing is adapted to receive a portion of the pin 70. The bushing can be formed from metal or plastic.

As shown in FIGS. 3 and 4, the number of pins 70 can vary between the pair of opposed first edges 52 of the shelf 50. Similarly, the number of apertures 80 can vary between the opposed sides of the lower assembly 14. Varying the number of pins 70 and corresponding apertures 80 between the first sides 52 ensures the proper assembly of the lower assembly 14 because the shelf 50 can be connected to the lower frame member 32 in only one manner.

When the shelf 50 is placed within the interior space 40 such that the pin 70 is received by the aperture 80, the shelf 50 is connected to the lower frame member 28. As a result, the structural integrity of both the lower assembly 14 and the grill assembly 10 is increased. Described in another manner, the shelf 50 provides structural integrity to the lower assembly 14 and the grill assembly 10 when the pin 70 is received by the aperture 80.

Depending upon the configuration of the upper assembly 12, the shelf 50 can be employed to connect to the upper frame members 13 of the upper assembly 12. In this manner, the shelf 50 provides structural integrity to the upper assembly 12 and the grill assembly 10 when the pin 70 is received by an aperture positioned in the upper frame member 13.

Because the pin 70 is removably received by the aperture 80, the shelf 50 can be quickly and easily disengaged from the cross-member 28. This is an important aspect for packaging and storage of the grill assembly 10 because the dimensions and configuration of the lower assembly 14 can be significantly reduced. In contrast to existing designs, no tools are required to disengage the shelf 50 from the cross-member 28 and disassemble the lower assembly 14. When the pin 70 is disengaged from the cross-member 28, the configuration and dimensions of the aperture 80 remain unchanged.

The shelf 50 can include means for locking (not shown) the pin 70 in the aperture 80. By locking the pin 70 within the aperture 80, the locking means further increases the structural integrity of the lower assembly 14. The locking means can include a detent and a cooperating groove, a flange on the pin 70, or a latch.

The shelf 50 and its related components, including the pin 52, can be formed from plastic, steel, aluminum, or other metals, including metal alloys. FIGS. 1-4 show an open grill assembly 10, meaning that the upper and lower assemblies 12, 14 are not enclosed. Panels and doors can be added to the grill assembly 10 to form an enclosed cabinet (not shown) positioned beneath the cooking chamber 16. Consistent with the above disclosure, the shelf 50 can be employed within the cabinet to form either a bottom wall or a top wall of the cabinet. In this configuration, the shelf 50 connects the panels and doors and provides structural integrity to the cabinet.

In another preferred embodiment, the grill assembly 10 has a single frame assembly, meaning that the grill assembly 10 does not have distinct upper and lower assemblies 12, 14. As a result, there is no junction between the upper and lower assemblies 12, 14 and the grill assembly 10 has a continuous appearance. In this configuration, the single frame assembly is adapted to receive and/or support the cooking chamber 16. The single frame assembly is formed from a combination of frame members, including vertical, horizontal, and/or cross-members. The frame members define an interior space 40 and the shelf 50 is cooperatively dimensioned with the interior space 40 such that the shelf 50 is positioned within the interior space 40.

At least one frame member has an aperture cooperatively dimensioned with the pin 70. Preferably, the frame member is located in a lower portion of the single frame assembly. However, the frame member can be located in an upper or intermediate portion of the single frame assembly. The aperture is adapted to removably receive the pin 70. In a manner consistent with the above disclosure, the shelf 50 is connected to the frame member. Consequently, the shelf 50 provides structural integrity to the single frame assembly and the single frame assembly is secured by the connection of the shelf 50 and the frame member.

Another preferred embodiment includes a frame for an outdoor cooking device (not shown) generally comprising an upper frame assembly and a lower frame assembly. The shelf 50 is employed within the lower frame assembly in a manner consistent with the above disclosure. Accordingly, the shelf 50 connects the lower assembly and provides structural integrity to the lower assembly.

Instead of receiving a cooking chamber, the frame is adapted to receive a cooking device, for example an auxiliary burner such as an outdoor stove-top burner, or a deep fryer. The frame is adapted to be mobile such that the frame and the cooking device can be moved between various locations, thereby increasing the versatility of the frame.

Figure 5:
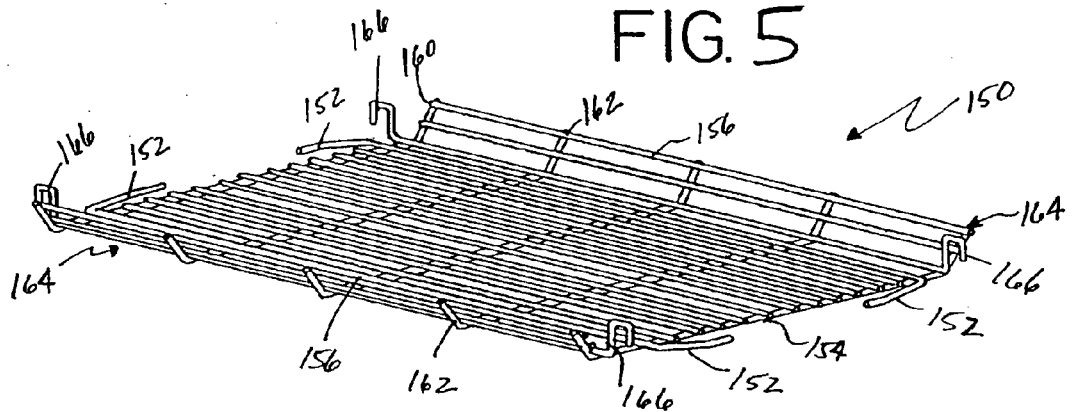
FIG. 5 is a perspective view of a second shelf embodiment.

In another preferred embodiment shown in FIG. 5, the grill assembly 10 includes a shelf 150. The shelf 150 has a pair of opposed first edges 154 and a pair of opposed second edges 156. The edges 154, 156 form a perimeter P of the shelf 150. Although shown as having a generally rectangular configuration, the shelf 150 can have a variety of configurations, including square, elliptical or other curvilinear shapes.

The shelf 150 has at least one securing member 152. The securing member 152 is a flexible structure adapted to be deformed or displaced a distance. Preferably, the securing member 152 extends from the shelf 150 such that a clearance exists between the securing member 152 and the second edge 156. The dimensions of the clearance varies with the configuration of the securing member 152. Although shown as having an angular configuration, the securing member 152 can have a curvilinear configuration. Described in a different manner, the securing member 152 is an elongated tab that extends from the shelf 150.

Preferably, the shelf 150 is a wire rack formed from a plurality of welded rods. The shelf 150 comprises a plurality of longitudinal rods 160 and a plurality of transverse rods 162. Although the transverse rods 162 are shown in FIG. 5 as being positioned below the longitudinal rods 160, the orientation of the rods 160, 162 can be varied according to the design parameters of the shelf 150. A raised or angled portion 164 is positioned proximate the second edge 156. Alternatively, the raised portion 164 is positioned proximate the first edge 154. Because the shelf 150 is formed from a plurality of welded rods, the shelf 150 is stronger and more rigid than existing shelves having a thin-wall construction. Although shown as having a plurality of apertures or openings resulting from the intersection of the rods 162, 164, the shelf 150 can have a solid construction without apertures or openings.

Figure 7:
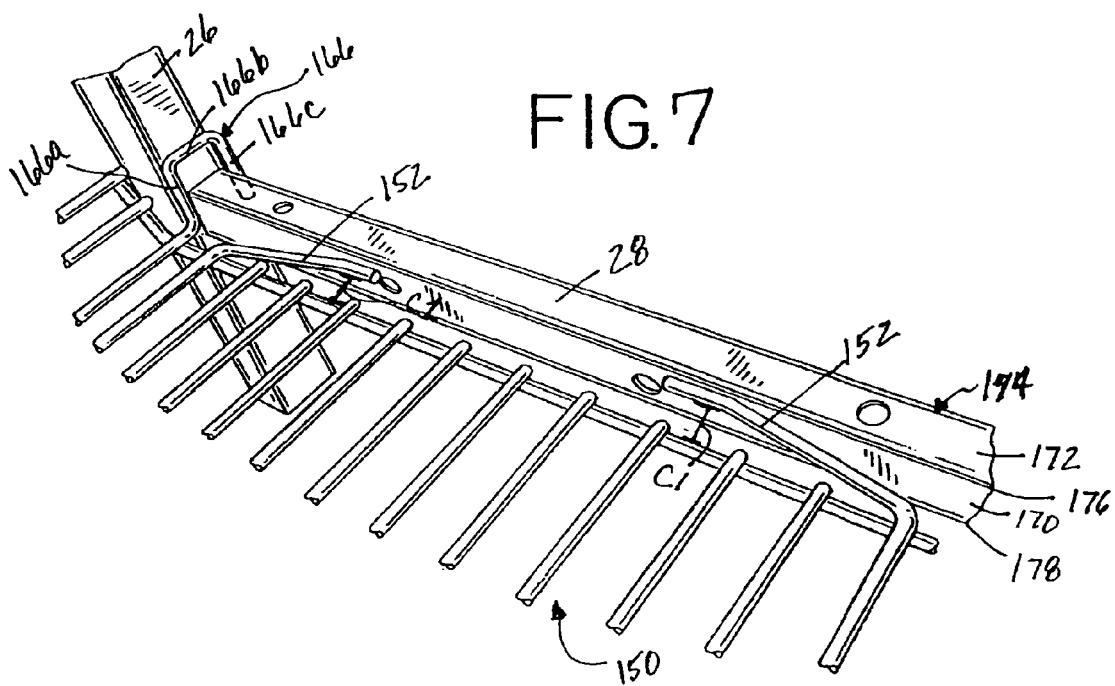
FIG. 7 is a partial perspective view of the shelf of FIG. 5, showing the shelf in a first position.

The shelf 150 has at least one support member 166. The support member 166 is adapted to engage a portion of the cross-member 28 when the shelf 150 is connected to the cross-member 28. Preferably, the support member 166 is positioned near the junction of the first and second edges 154, 156. Alternatively, the support member 166 is spaced a distance from the junction of the first and second edges 154, 156. Referring to FIG. 7, the support member 166 has a first portion 166a, a second portion 166b, and a third portion 166c defining a recess adapted to receive a portion of the cross-member 28. Although the support member 166 is shown as having an angular configuration, the support member 166 can have a number of configurations, including a curvilinear configuration.

Although FIG. 5 shows four separate securing members 152 and four separate supporting members 166, the precise number of these elements varies with the design parameters of the shelf 150 and the lower assembly 14. Accordingly, the number of securing members 152 and supporting members 166 can be increased or decreased.

Figure 6:
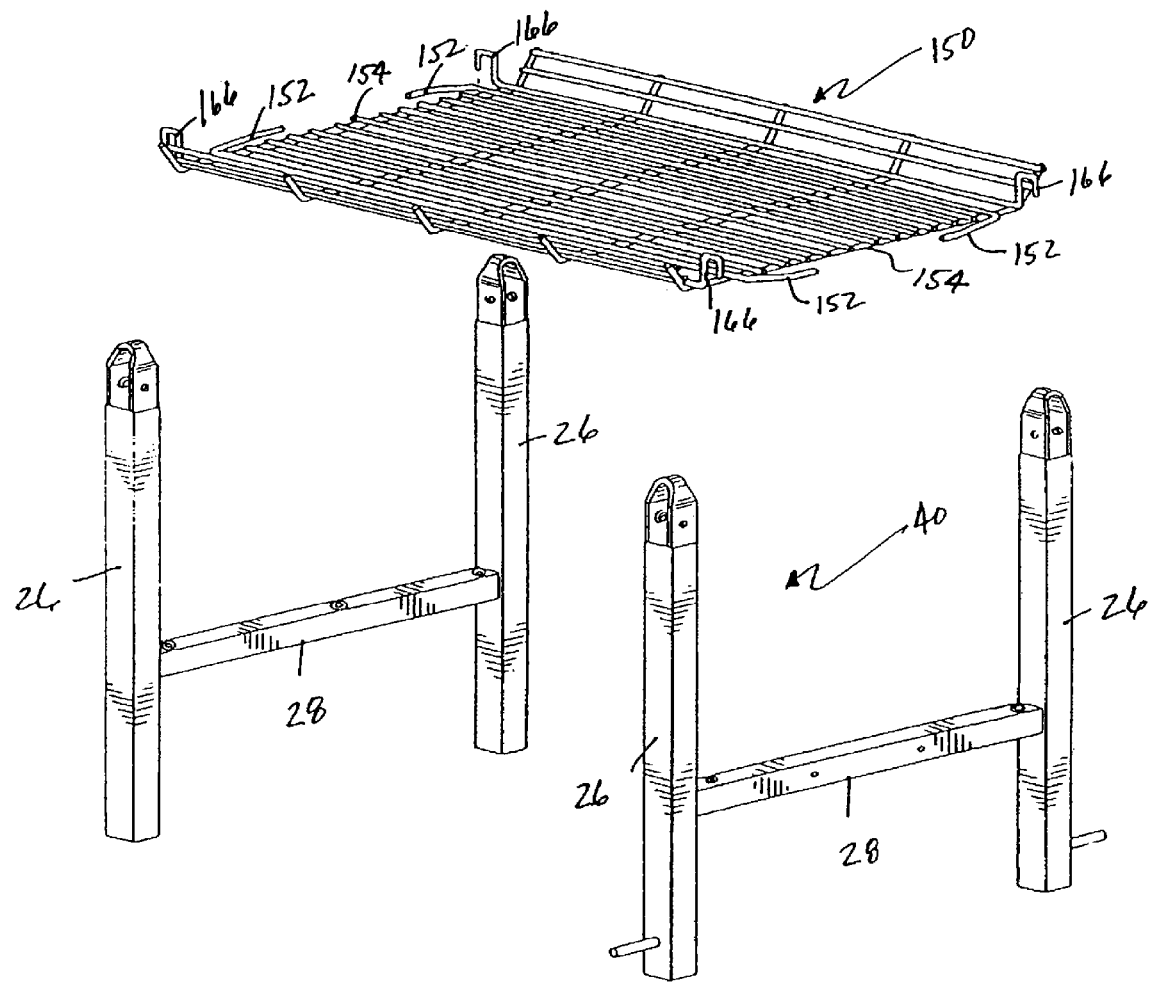
FIG. 6 is an exploded view of the shelf of FIG. 5, showing the shelf prior to engagement with a plurality of lower frame members.

Referring to FIG. 6, the H-shaped subassemblies 30 of the lower frame assembly 14 are spaced a distance defining the interior space 40. At an initial position P0 (not shown), the shelf 150 is generally positioned within the interior space 40 but does not engage any portion of the lower assembly 14. At the initial position P0, the lower assembly 14 lacks structural integrity because the H-shaped assemblies 30 are not connected. At the initial position P0, an initial clearance C0 exists between the securing member 152 and the first edge 154 of the shelf 150.

The shelf 150 is adapted to be moved between the initial position P0, a first position P1, and a second position P2. When a sufficient amount of force is applied to the shelf 150 in a downward direction, the shelf 150 moves from the initial position P0 towards the first position P1. At the first position P1, shown in FIG. 7, the shelf 150 is positioned within the interior space 40 and in partial engagement with the lower assembly 14. Specifically, the securing member 152 slidingly engages a portion of the inner wall 170 of the cross-member 28. In addition, the support member 166 engages a portion of the inner wall 170 and/or an outer wall 174.

The securing member 152 and the support member 166 continue to engage the cross-member as the downward force is applied to the shelf 150. Accordingly, the securing member 152 flexes inward an amount as the securing member 152 slidingly engages the inner wall 170 and moves from a first edge 176 of the inner wall 170 towards a second edge 178 of the inner wall 170. As the securing member 152 slidingly engages the inner wall 170, a first clearance C1 exists between the securing member 152 and the shelf 150. Because the securing member 152 flexes inward an amount, the first clearance C1 is smaller than the initial clearance C0.

Figure 9:
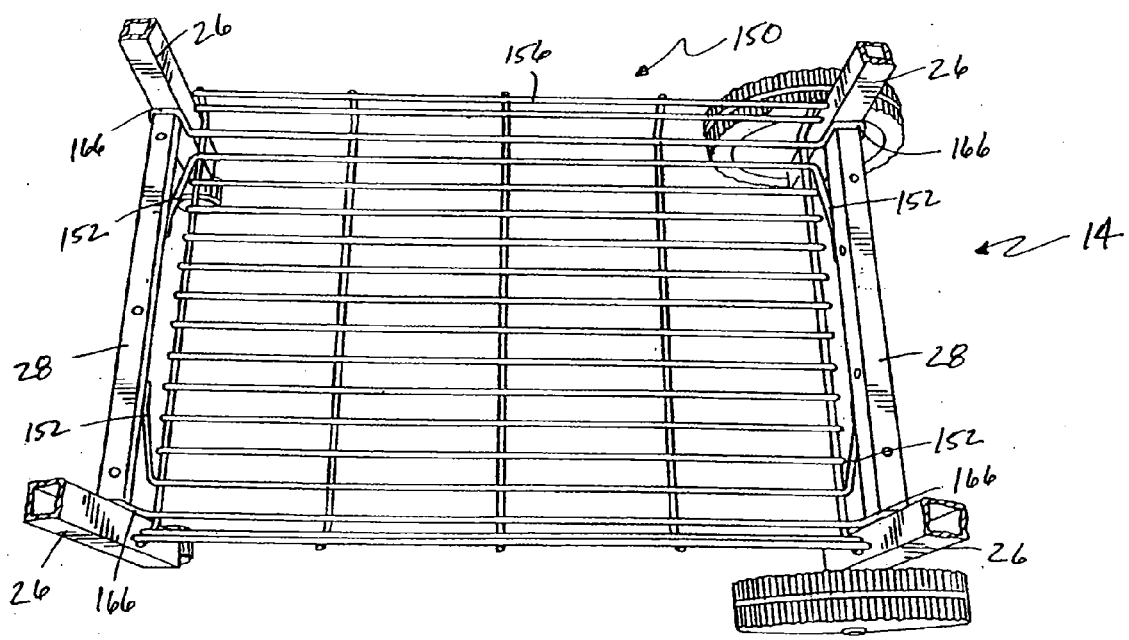
FIG. 9 is a partial perspective view of the shelf of FIG. 5, showing the shelf in the second position connected to the lower frame assembly.
Figure 8:
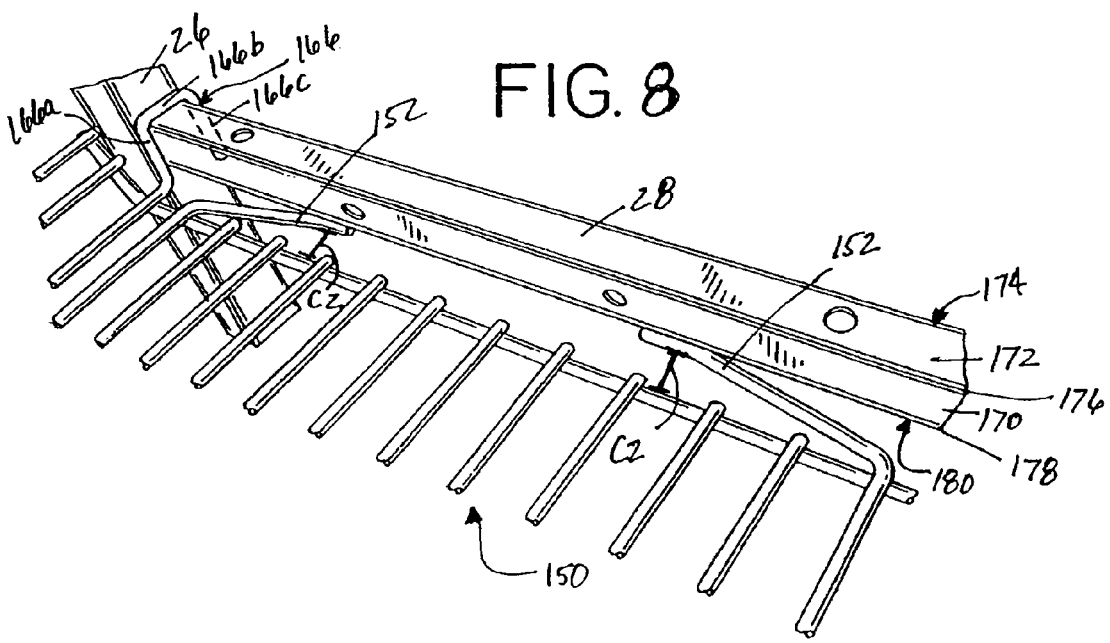
FIG. 8 is a partial perspective view of the shelf of FIG. 5, showing the shelf in a second position.

The securing member 152 continues to slidingly engage the inner wall 170 as the shelf 150 and the securing member 152 move towards a second position P2. At the second position P2 and as shown in FIGS. 8 and 9, the securing member 152 lockingly engages a portion of a bottom wall 180 of the cross-member 28. In addition, the support member 166 engages a portion of the inner wall 170, a top wall 172, and/or an outer wall 174 of the cross-member 28. A second clearance C2 exists between the securing member 152 and the shelf 150 when the securing member 152 engages a portion of the bottom wall 180. Due to the flexing of the securing member 152 in the first position P1, the second clearance C2 is greater than the first clearance C1. In a preferred embodiment, the second clearance C2 is equal to the initial clearance C0.

Referring to FIG. 9, in the second position P2, the securing member 152 is in locking engagement with a portion of the bottom wall 180 of the cross-member 28 wherein the locking engagement prevents upward movement of the shelf 150. The supporting member 166 is in engagement with a portion of the inner wall 170, a top wall 172, and/or an outer wall 174 wherein the engagement prevents downward movement of the shelf 150. Described in a different manner, a portion of the cross-member 28 is received by the recess defined by the first, second, and third portions 166a, 166b, 166c of the supporting member 166. Consequently, the shelf 150 is locked in a stable position and as a result, the lower assembly 14 has increased structural rigidity. Described in another manner, the shelf 150 provides structural integrity to the lower assembly 14 when the securing member 152 and the support member 166 are located in the second position P2. As a result, the lower assembly 14 has a sufficient amount of stability to permit the alignment and engagement of the upper assembly 12 with the lower assembly 14. In a configuration with a grill assembly having a single frame with no distinct upper and lower assemblies, in the second position P2, the securing member 152 and the supporting member 166 connect and secure the single frame of the grill assembly.

Alternatively, the securing member 152 is lockingly engaged by a structure formed in a portion of the cross-member 28 in the second position P2. For example, the securing member 152 is lockingly engaged by a detent formed in a portion of the cross-member 28. Unlike the support member 166, the securing member 152 is adapted to be deformed between the initial, first and second positions P0, P1, P2. This means that the securing member 152 deforms or flexes inward as it slidingly engages the inner wall 170 of the cross-member 28. The degree or amount of deformation varies with the dimensions and configuration of the securing member 152. Preferably, the securing member, 152 is biased towards the initial position P0 or the second position P2.

The shelf 150 and its related components can be formed from plastic, steel, aluminum, or other metals, including metal alloys. The securing member 152 is preferably formed from metal because of its high strength and favorable deformation properties. Depending upon the material used to form the securing member 152, the degree and amount of elastic deformation of the securing member 152 will vary.

Figure 11:
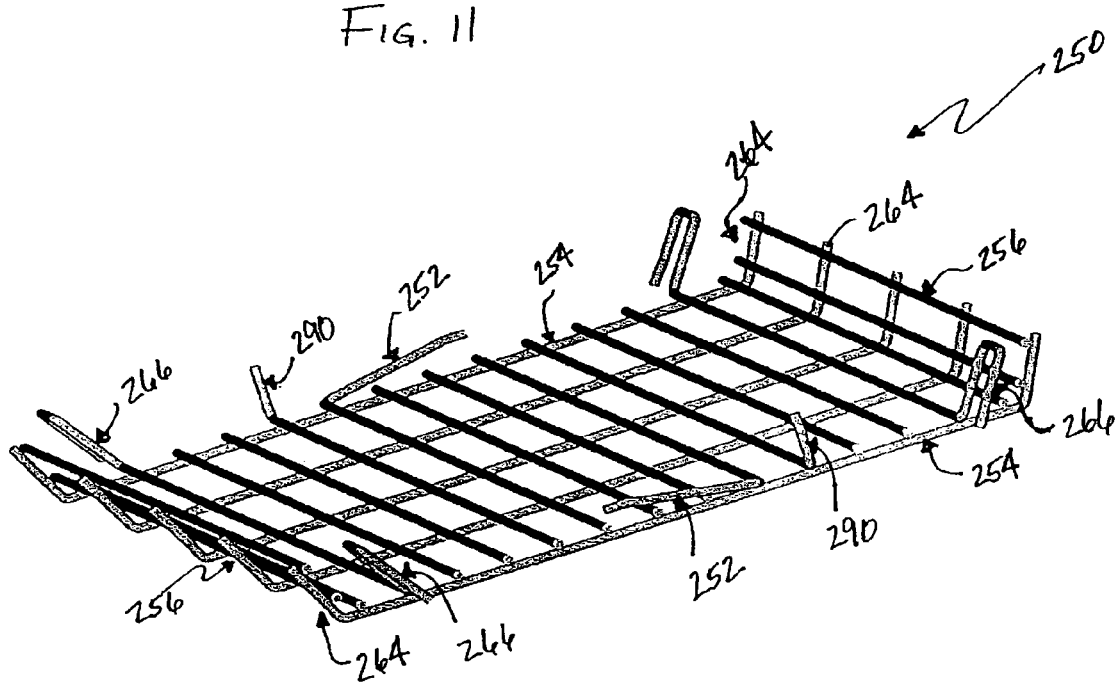
FIG. 11 is a perspective view of the shelf of FIG. 10.

In another preferred embodiment shown in FIGS. 10 and 11, the grill assembly 10 includes a shelf 250. The shelf 250 has a pair of opposed first edges 254 and a pair of opposed second edges 256. The edges 254, 256 form a perimeter P of the shelf 250. Although shown as having a generally rectangular configuration, the shelf 250 can have a variety of configurations, including square, elliptical or other curvilinear shapes.

The shelf 250 has at least one securing member 252. The securing member 252 is a flexible structure adapted to be deformed or displaced a distance. Preferably; the securing member 252 extends from the shelf 250 such that a clearance exists between the securing member 252 and the second edge 256. Although shown as having an angular configuration, the securing member 252 can have a curvilinear configuration. Described in a different manner, the securing member 252 is an elongated tab that extends from the shelf 250.

Preferably, the shelf 250 is a wire rack formed from a plurality of welded rods. The shelf 250 comprises a plurality of longitudinal rods 260 and a plurality of transverse rods 262. Although the transverse rods 262 are shown in FIGS. 10 and 11 as being positioned below the longitudinal rods 260, the orientation of the rods 260, 262 can be varied according to the design parameters of the shelf 250. A raised or angled portion 264 is positioned proximate the second edge 256. Alternatively, the raised portion 264 is positioned proximate the first edge 254. Because the shelf 250 is formed from a plurality of welded rods, the shelf 250 is stronger and more rigid than existing shelves having a thin-wall construction. Although shown as having a plurality of apertures or openings resulting from the intersection of the rods 262, 264, the shelf 250 can have a solid construction without apertures or openings.

The shelf 250 has at least one support member 266 extending from the first edge 254. The support member 266 is adapted to engage a portion of the cross-member 28 when the shelf 250 is connected to the cross-member 28. Referring to FIGS. 10 and 11, the support member 226 has a first portion 266a, a second portion 266b, and a third portion 266c, and a fourth portion 266d defining a recess adapted to receive a portion of the cross-member 28. Preferably, the recess has dimensions slightly larger than the dimensions of the cross-member 28. The support member 226 has an angled or sloped configuration which facilitates engagement with the lower member 28 without causing abrasions on the lower member 28. Although the support member 266 is shown as having an angular configuration, the support member 266 can have a number of configurations, including a curvilinear configuration.

The shelf 250 has at least one finger 290 extending from the first edge 254. The finger 290 has a first portion 290a that is substantially vertical. The finger 290 is adapted to engage a portion of the cross-member 28 when the shelf 250 is connected to the cross member 28. Specifically, the finger 290 engages a portion of the inner wall 170 of the cross-member 28.

Although FIGS. 10 and 11 show two separate securing members 252, two separate supporting members 266, and two separate fingers 290, the precise number of these elements varies with the design parameters of the shelf 250 and the lower assembly 14. Accordingly, the number of securing members 252, supporting members 266, and the fingers 290 can be increased or decreased.

At an initial position P0 (not shown), the shelf 250 is generally positioned within the interior space 40 but does not engage any portion of the lower assembly 14. At the initial position P0, the lower assembly 14 lacks structural integrity because the H-shaped assemblies 30 are not connected. At the initial position P0, an initial clearance C0 exists between the securing member 252 and the first edge 254 of the shelf 250.

The shelf 250 is adapted to be moved between the initial position P0, a first position P1, and a second position P2. When a sufficient amount of force is applied to the shelf 250 in a downward direction, the shelf 250 moves from the initial position P0 towards the first position P1. At the first position P1, the shelf 250 is positioned within the interior space 40 and in partial engagement with the lower assembly 14. Specifically, the securing member 252 slidingly engages a portion of the inner wall 170 of the cross-member 28. Also, the support member 266 slidingly engages a portion of the inner wall 170 and/or an outer wall 174. In addition, the finger 290 slidingly engages a portion of the inner wall 170 of the cross-member 28.

The securing member 252, the support member 266, and the finger 290 continue to engage the cross-member 28 as the downward force is applied to the shelf 150. Accordingly, the securing member 152 flexes inward an amount as the securing member 152 slidingly engages the inner wall 170 and moves from a first edge 176 of the inner wall 170 towards a second edge 178 of the inner wall 170. As the securing member 252 slidingly engages the inner wall 170, a first clearance C1 exists between the securing member 252 and the shelf 250. Because the securing member 252 flexes inward an amount, the first clearance C1 is smaller than the initial clearance C0.

The securing member 252 continues to slidingly engage the inner wall 170 as the shelf 250 and the securing member 252 move towards a second position P2. At the second position P2, the securing member 252 lockingly engages a portion of a bottom wall 180 of the cross-member 28. Also, the support member 266 engages a portion of the inner wall 170, a top wall 172, and/or an outer wall 174 of the cross-member 28. In addition, the first portion 290a of the finger 290 engages a portion of the inner wall 170. A second clearance C2 exists between the securing member 252 and the shelf 250 when the securing member 252 engages a portion of the bottom wall 180. Due to the flexing of the securing member 252 in the first position P1, the second clearance C2 is greater than the first clearance C1. In a preferred embodiment, the second clearance C2 is equal to the initial clearance C0.

In the second position P2, the securing member 252 is in locking engagement with a portion of the bottom wall 180 of the cross-member 28 wherein the locking engagement prevents upward movement of the shelf 250. The supporting member 266 is in engagement with a portion of the inner wall 170, a top wall 172, and/or an outer wall 174 wherein the engagement prevents downward movement of the shelf 250. The finger 290 is in engagement with a portion of the inner wall 170 wherein the engagement prevents lateral movement between the structures of the lower assembly 14. Consequently, the shelf 250 is locked in a stable position and as a result, the lower assembly 14 has increased structural rigidity. Described in another manner, the shelf 250 provides structural integrity to the lower assembly 14 when the securing member 252, the support member 266, and the finger 290 are located in the second position P2. As a result, the lower assembly 14 has a sufficient amount of stability to permit the alignment and engagement of the upper assembly 12 with the lower assembly 14.

The shelf 250 and its related components can be formed from plastic, steel, aluminum, or other metals, including metal alloys.

The barbecue grill assembly 10 can be assembled in a-method involving a small number of steps. The shelf 50 is positioned within the lower frame assembly 14 and connected to the frame member 26, 28 in the manner disclosed above. Thus, the shelf 50 connects and secures the lower assembly 12. The upper frame assembly 12 can then be brought into engagement with the lower assembly 14. The cooking chamber 16 and the related controls can then be positioned on the upper assembly 12. Alternatively, the cooking chamber 16 is connected to the upper assembly 12 to secure the upper assembly 12. Next, the upper assembly 12 is brought into engagement with the lower assembly 14. Means for securing the upper and lower assemblies 12, 14 are then applied to secure the grill assembly 10. Securing means can include a threaded fastener and nut, or a projection and a receiver.

Alternatively, the grill assembly 10 can have single frame assembly without distinct lower and upper assemblies 12, 14. Consistent with the above disclosure, the shelf 50 is connected and secured to a lower portion of the single frame assembly. Next, the cooking chamber 16 is connected and secure to an upper portion of the single frame assembly. Means for securing the single frame assembly are then applied to secure the grill assembly 10. Securing means can include a threaded fastener and nut, or a projection and a receiver.

Figure 12:
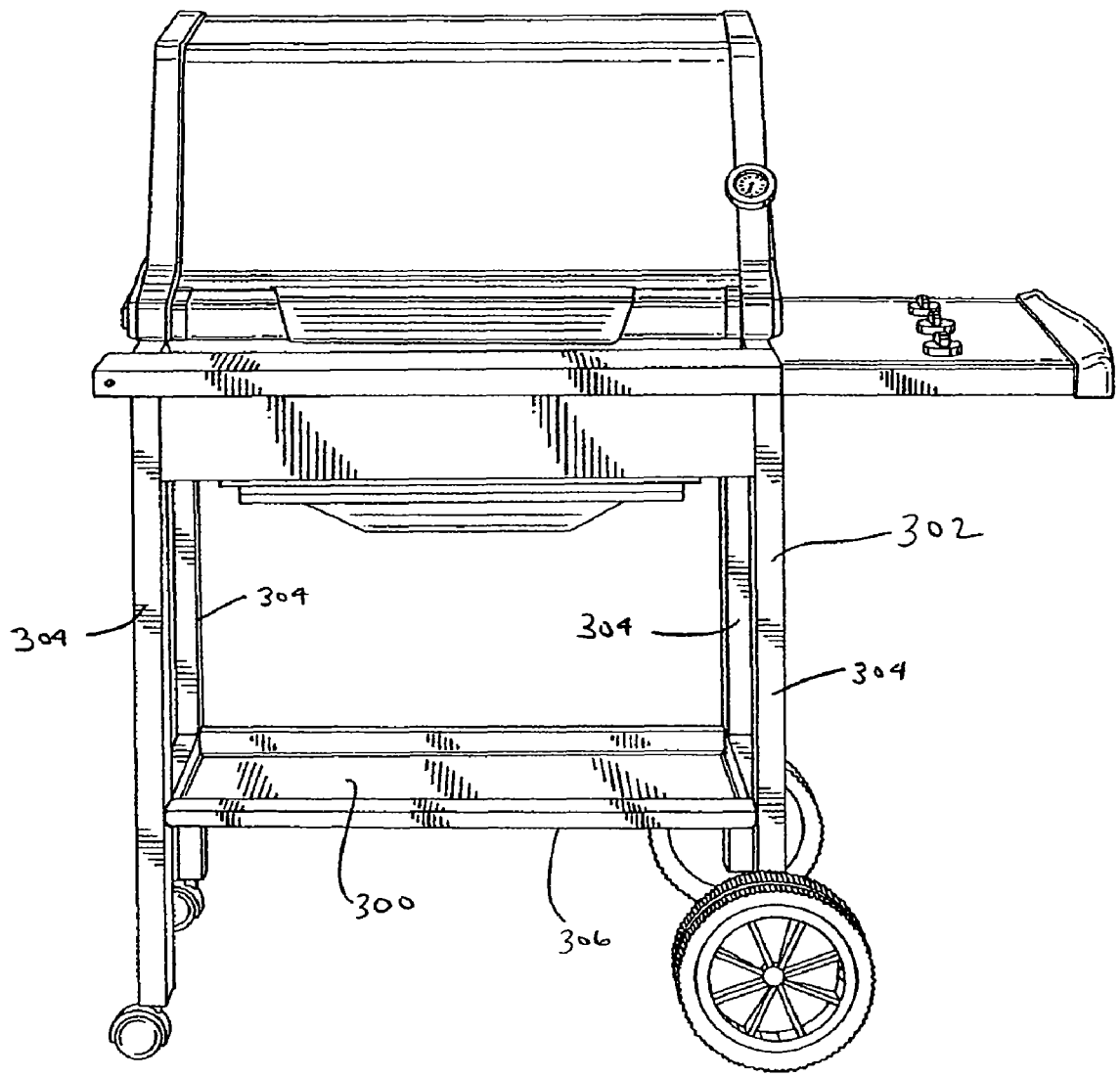
FIG. 12 is a front elevation view of a barbecue grill assembly including another embodiment of the shelf of the present invention.

Another embodiment of the shelf 300 of the present invention is shown in FIGS. 12-19C. As shown in FIG. 12, this embodiment of the shelf 300 is connected to a barbecue grill frame assembly 302. The barbecue grill frame assembly 302 may be a multiple frame assembly or a single frame assembly, as described above. A single frame assembly is illustrated in FIG. 12. The frame assembly 302 includes a plurality of leg members 304, and a plurality of cross-members 306 extending therebetween. As such, the grill frame assembly 302 defines an interior space between the leg members 304 of the barbecue grill frame assembly 302. It is understood by those of skill in the art that the shelf 300 of the present invention may be utilized with any frame structure, including structures with walls and/or cabinet doors.

Figure 18:
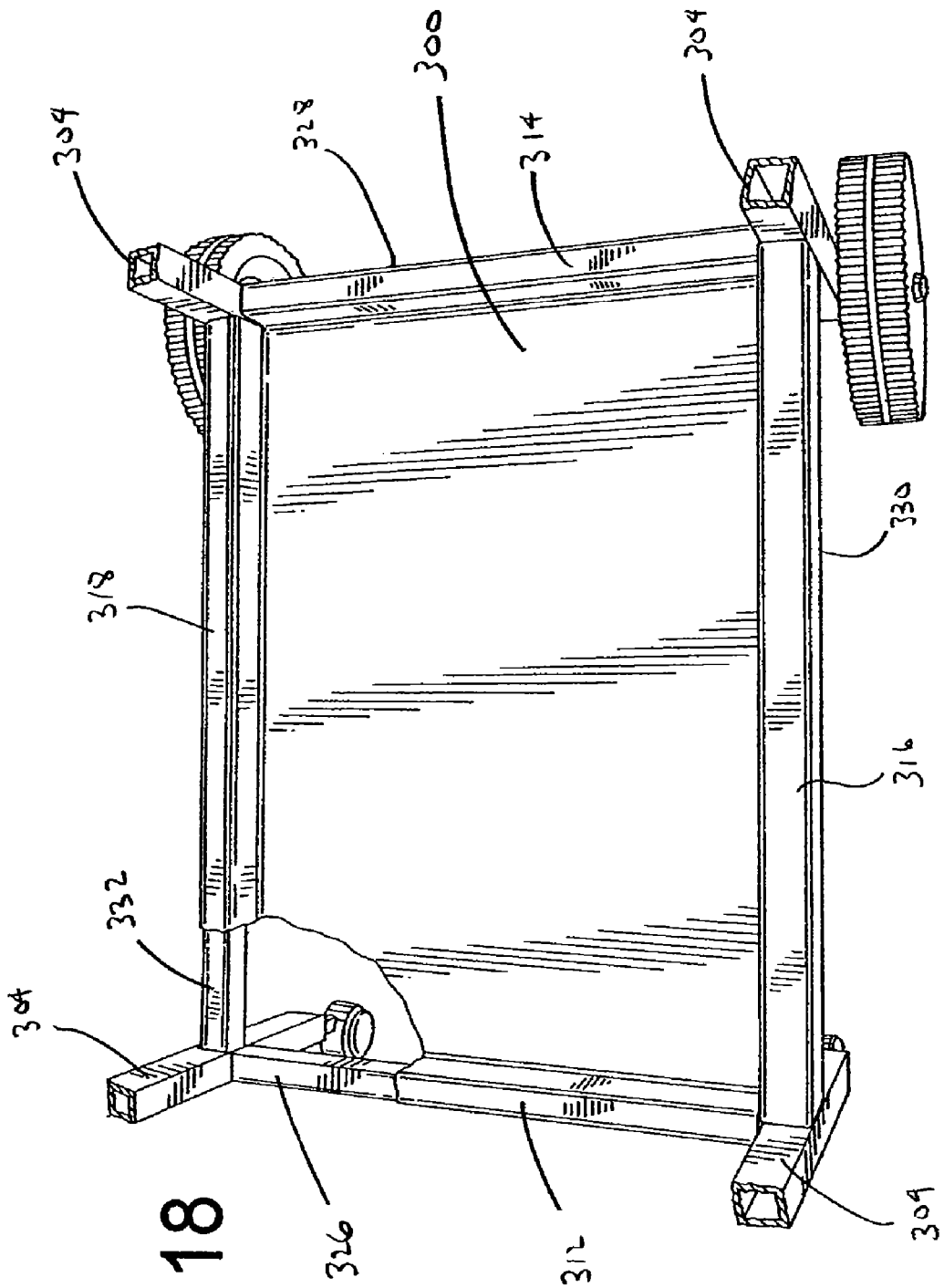
FIG. 18 is a partial cut-away perspective view of the shelf of the present invention.

As shown in FIGS. 12 and 18, the shelf 300 of the present invention is cooperatively dimensioned such that the shelf 300 is substantially positioned within the interior space of the barbecue grill frame assembly 302. In this position a substantial portion of the shelf 300 is located within the interior space of the barbecue grill frame assembly 302.

Figure 13:
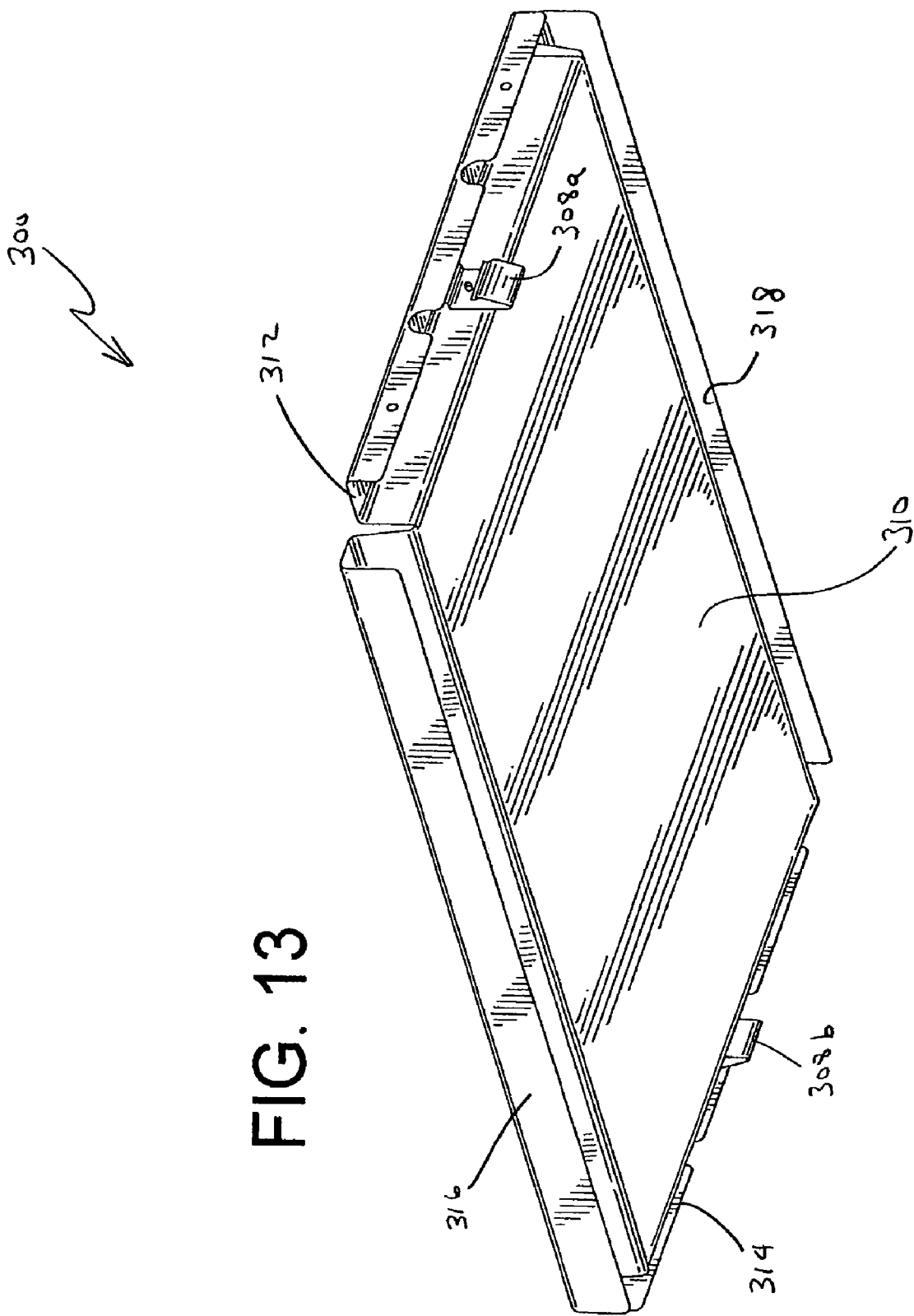
FIG. 13 is a bottom perspective view of the shelf of FIG. 12.

In one embodiment, the shelf 300 has a securing member 308, as shown in FIG. 13. The securing member 308 may comprise any component which is capable of securing the shelf 300 to the barbecue grill frame assembly 302. In one embodiment, the securing member 308 is connected to the shelf 300 with a rivet 342. The securing member 308 is used to removably secure the shelf 300 to the barbecue grill frame assembly 302. As illustrated in the preferred embodiments of the invention, the securing member 308 comprises a quick release member or a flexible spring member. Such a spring member 308 may be a leaf spring type member or other spring that can be moved from a first position to a second position through the application of force, but which is biased toward the first position and returns to the first position when the force is removed.

As shown in FIGS. 13-16, one preferred embodiment of the shelf 300 of the present invention is provided. The shelf 300 comprises a bottom wall 310, two pair of opposing sidewalls 312, 314 and 316, 318, and opposing securing members 308a, 308b. The first pair of opposing sidewalls comprises a first sidewall 312 and a second sidewall 314 opposing the first sidewall 312, and the second pair of opposing sidewalls comprises a third sidewall 316 and a fourth sidewall 318 opposing the third sidewall 316. The shelf 300 may be made with a bottom wall 310 that is substantially solid, or with one that has a plurality of apertures therethrough. Additionally, the shelf 300 may be made of a wire rack connected to securing members 308. In a preferred embodiment, the bottom wall 310 of the shelf 300 is substantially planar, however it may be domed concave or convex.

The sidewalls 312-318 depend from the bottom wall 310. And, the opposing securing members 308a, 308b depend from opposing first and second sidewalls 312, 314. As shown in FIGS. 13-16, two securing members 308a, 308b are utilized. However, as is understood by those having ordinary skill in the relevant art, more or less than two securing members 308 may be incorporated into the present invention. Additionally, if more than one securing member 308 is utilized, they may be located on adjacent sidewalls, or they may be located on opposing sidewalls. Further, the securing members 308 may be connected to the bottom wall 310 of the shelf 300.

Figure 17:
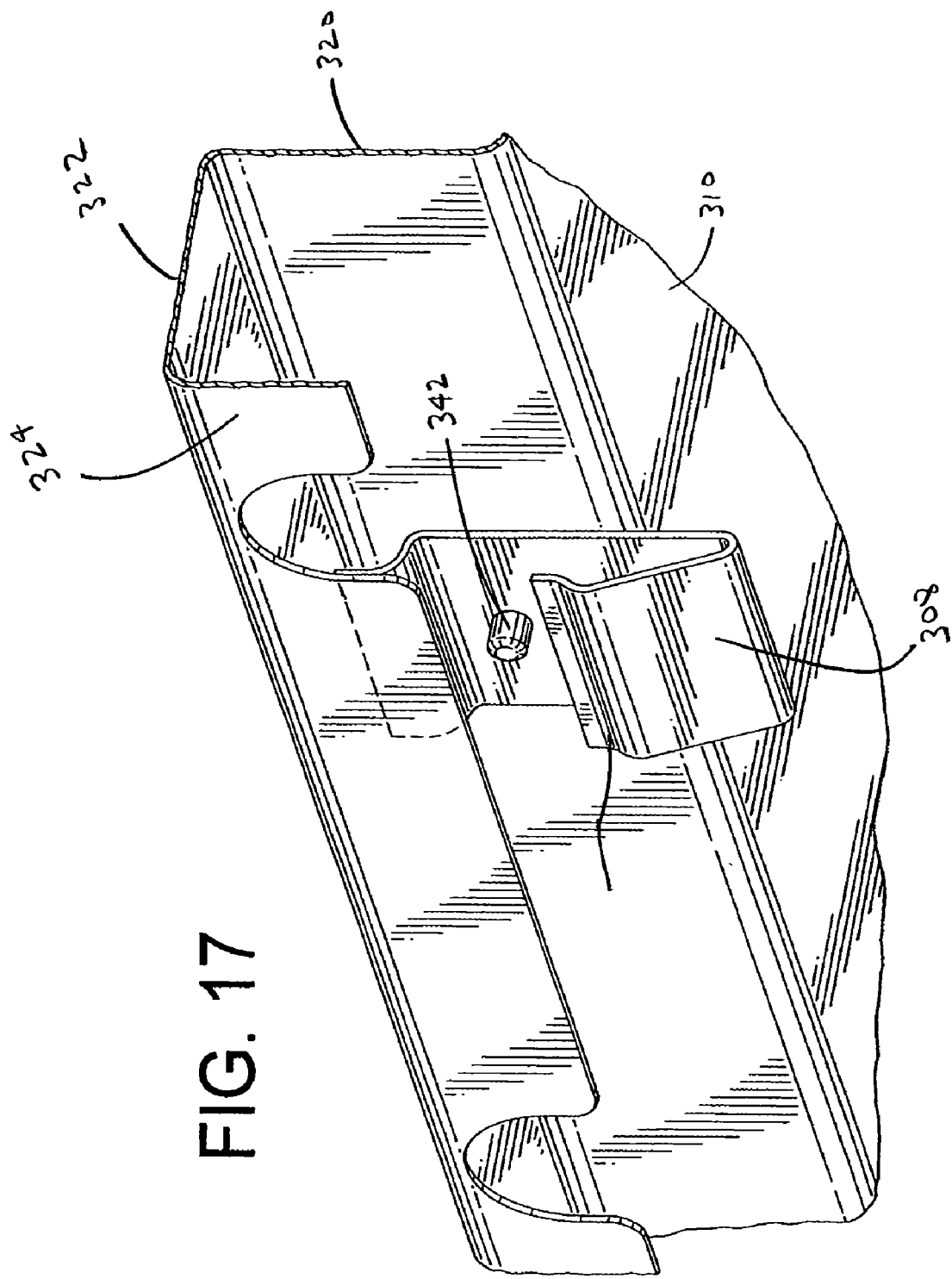
FIG. 17 is a partial perspective view of the spring member of the shelf of the present invention.

In one preferred embodiment, as best shown in FIGS. 15 and 17, the sidewalls 312-318 have an upstanding member 320, a transverse member 322 and a downturned member 324. Such a configuration may result in an inverted U-shaped member that depends from the bottom member 310. Typically, each U-shaped member engages a different cross-member 306 of the barbecue grill frame assembly 302 to seat the shelf 300 on the barbecue grill frame assembly 302. Accordingly, as shown in FIGS. 12 and 18, the first U-shaped member 312 engages a first cross member 326 of the barbecue grill frame assembly 302, the second U-shaped member 314 engages a second cross member 328 of the barbecue grill frame assembly 302, the third U-shaped member 316 engages a third cross member 330 of the barbecue grill frame assembly, and the fourth U-shaped member 318 engages a fourth cross member 332 of the barbecue grill frame assembly.

In a preferred embodiment, including where the shelf 300 is made from a piece of sheet material, the sidewalls 312-318 are typically made from the same material as the bottom wall, 300 of the shelf 300. As such, the sidewalls 312-318 may be made by bending the perimeter portions of the shelf 300 to create the various members (i.e., upstanding member 320, a transverse member 322 and a downturned member 324) of the shelf 300. Generally, the upstanding member 320 of the sidewall depends directly from the bottom wall 310 of the shelf 300. In alternative embodiments, all of some of the sidewalls 312-318 may be made of only one or more of the various members 320-324 of the sidewall. As such, a sidewall may be made of only a downturned member 324; alternatively, a sidewall may be made of only a transverse member 322; alternatively, a sidewall may be made of a transverse member 322 and a downturned member 324; alternatively, a sidewall may be made of an upstanding member 320 and a transverse member 322. Further, additional alternatives exist. Generally, each of the alternative sidewall structures would depend from the bottom wall.

As shown in FIGS. 12 and 19A-19C, in one preferred embodiment, when the shelf 300 is seated on the barbecue grill frame assembly 302, the first and second sidewalls 312, 314 that have securing members 308a, 308b are seated on the cross members 326, 328 by having the downturned members 324 and the transverse members 322 of these sidewalls 312, 314, as well as the securing members 308a, 308b engage the respective cross members 326, 328 of the barbecue grill frame assembly 302 to fully seat the shelf 300. With respect to the third and fourth sidewalls 316, 318 of this embodiment that do not have securing members 308, typically only the transverse members 322 and possibly the downturned members 324 engage the respective cross members 330, 332. The upstanding member 320 of the third and fourth sidewalls 316, 318 may, however, engage the cross members 330, 332. Drain areas to allow water and other fluid debris to drain from the shelf 300 are provided in each of the corners of the shelf 300 where the sidewalls 312-318 of the shelf 300 meet the leg members 304 of the barbecue grill.

The securing member 308 is typically a flexible structure that is adapted to be deformed or displaced a distance. In a preferred embodiment, the securing member 308 is a spring that moves from a first position, as shown in FIG. 19C, where the shelf 300 is secured to the barbecue grill frame assembly 302, to a second position, as shown in FIG. 19B, to allow the shelf 300 to be detached from the barbecue grill frame assembly 302. The securing member 308 may also move to a third position, as shown in FIG. 19A, which is the securing members 308 natural or rest position. In this position the securing member 308 is not engaging the cross member of the barbecue grill frame assembly 302. Depending on the shape of the cross member and the sidewalls of the shelf 300, the configuration of the securing member 308 in the third position may be the same as the configuration of the securing member 308 in the first position.

Referring to FIG. 19A, which shows one of the securing members 308, the securing member 308a is shown just prior to the shelf 300 engaging the barbecue grill frame assembly 302. As such, the securing member is shown in the third position. As the shelf 300 is pushed downward, the securing member 308a and the downturned member 324 of the sidewall 312 engage the cross member 326. When a sufficient force is applied to the shelf 300 in a downward direction, the shelf 300 moves from the third position (the rest position) to the second position. In moving to the second position, as shown in FIG. 19B, the engaging member 308a flexes inward toward the upstanding member 320 of the shelf 300 as the engaging member 308a slidingly engages a portion of the inner wall 334 of the cross member 326. The engaging member 308a continues to remain in the second position, and continues to slidingly engage a portion of the inner wall 334 of the cross member 326 until the engaging member 308a reaches the first position, as shown in FIG. 19C. In a preferred embodiment, the securing member 308 is biased toward the first position. In the first position, the shelf 300 is secured to the barbecue grill frame assembly 302. In the first position, a detent 311 in the engaging member 308a lockingly engages a portion of the bottom wall 336 of the cross member 326 of the barbecue grill frame assembly 302. Typically, it is the detent 311 portion of the securing member 308 that slidingly engages the cross member 326 of the barbecue grill frame assembly 302 during movement in the second position described above. If a second securing member 308b was incorporated into the shelf 300, then that securing member 308b would also be adjusted from the first position to the second position. Further, in the first position the transverse member 322 of the shelf 300 is positioned on an upper portion 338 of the cross member 326 of the barbecue grill frame assembly 302, and the downturned portion 324 of the shelf 300 is positioned adjacent and contacting an outer portion 340 of the cross member 326 of the barbecue grill frame assembly 302. The sidewall components in combination with the detent 311 contacting the portion of the bottom wall 336 of the cross member 326 operates to substantially prevent upward and downward movement of the shelf 300 when in the first position. And, the various components of the sidewalls (i.e., the downturned portion 324 and the upstanding portion 320) substantially prevent front-to-back and side-to-side lateral movement of the shelf 300 in the first position.

The securing member 308 is adapted to move from the first position, to the second position, to the third position, and the reverse. To remove or detach the shelf 300 from the barbecue grill frame assembly 302, as shown in FIGS. 19A-19C, the securing member 308a is adjusted from the first position to the second position. As explained above, in the first position (FIG. 19C) the securing member 308a lockingly engages a portion of the bottom wall 336 of the cross member 326 of the barbecue grill frame assembly 302. To release the securing member 308a, a release portion 309 of the securing member 308a is pushed away from the cross member 326 and toward the upstanding member 320 of the shelf 300. Substantially at the same time, or shortly thereafter, a force is exerted on the shelf 300 to raise the shelf 300. At this time, the engaging member 308a moves to the second position, as shown in FIG. 19B. As the shelf 300 is raised in the second position, the engaging member 308a slidingly engages a portion of the inner wall 334 of the cross member 326 until the shelf 300 is lifted above the cross members. When the engaging member 308a no longer engages the cross member 326, the engaging member will move to the third position, illustrated in FIG. 19A. All of the engaging members 308 operate in the same manner to both secure the shelf 300 to the barbecue grill frame assembly 302, and to allow the shelf 300 to be detached from the barbecue grill frame assembly 302. In this manner, the shelf 300 can be both secured to and removed from the barbecue grill frame assembly 302 without additional hardware.

Figure 20:
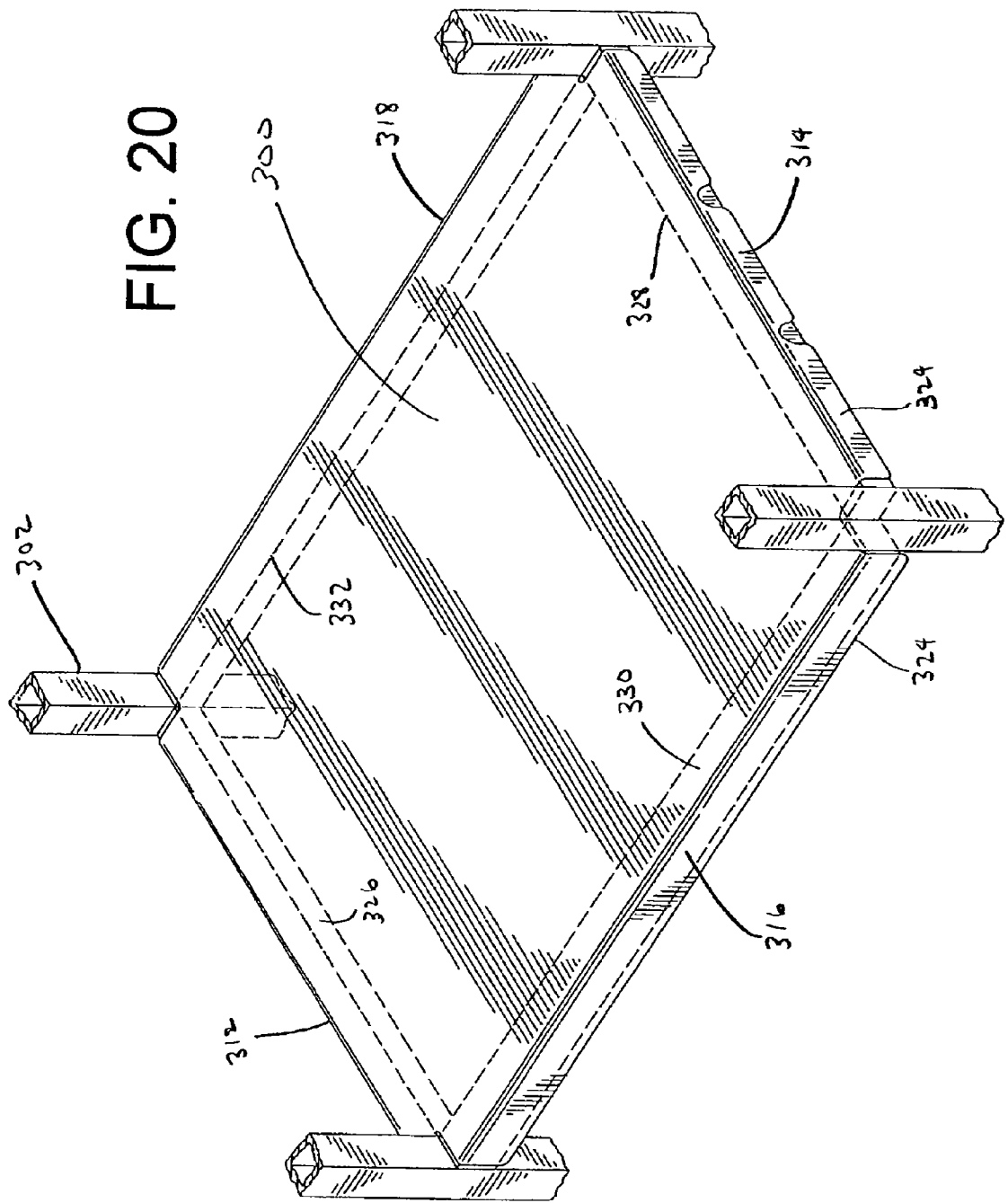

Additionally, the shelf 300 may be utilized without a securing member 308. In such an embodiment, the shelf 300 is configured and fabricated to allow one or more of the sidewalls 312-318 to engage the cross members of the barbecue grill frame assembly 302. In one such embodiment, shown in FIG. 20, the sidewalls 312-318 have a downturned portion 324. The downturned portion 324 of opposing sidewalls 312, 314 engages opposing cross members 326, 328 to seat the shelf 300 and secure the shelf 300 within the interior space of the barbecue grill frame assembly 302. As explained above, various combinations or alternatives of the sidewall members may also be incorporated in this embodiment without departing from the scope of the present invention. Alternatively, a flexible securing member 308 may be incorporated into the above structure to assist in securing the shelf 300 to the frame assembly 302.

While specific embodiments have been illustrated and described, numerous modifications come to mind without significantly departing from the spirit of the invention and the scope of protection is only limited by the scope of the accompanying Claims.

What is claimed is:

1. In a barbecue grill assembly comprising a frame assembly formed from a plurality of frame members defining an interior space, the frame assembly adapted to support a cooking chamber, the improvement comprising:
   a shelf generally positioned within the interior space, the shelf having at least one quick release member, the quick release member adapted to move between a first position, wherein the quick release member slidingly engages a portion of an inner wall of a first frame member of the plurality of frame members and wherein the quick release member allows for detachment of the shelf from the frame assembly, and a second position, wherein the quick release member lockingly engages a generally downwardly facing surface of the first frame member.

2. The barbecue grill assembly of claim 1 wherein the improvement further comprises:
   the frame assembly being defined by an upper frame assembly and a lower frame assembly, the lower frame assembly comprising a plurality of lower frame members and the upper frame assembly comprising a plurality of upper frame members, the upper assembly being adapted to support a cooking chamber; and,
   the plurality of lower frame members comprising the first frame member.

3. The barbecue grill assembly of claim 1 wherein the improvement further comprises:
   the quick release member is a spring member; and,
   the shelf includes a bottom wall and a plurality of sidewalls depending from the bottom wall, the sidewalls having an upstanding portion and a transverse portion.

4. The barbecue grill assembly of claim 1 wherein the improvement further comprises:

the quick release member having a detent extending therefrom;

the detent of the quick release member lockingly engaging the generally downwardly facing surface of the first frame member when the quick release member is in the second position.

5. The barbecue grill assembly of claim 4 wherein the improvement further comprises:

the shelf having a downturned portion; and, the downturned portion being adapted to engage an outside surface of the first frame member and the quick release member being adapted to engage an inside surface of the first frame member, wherein the downturned portion and the quick release member resist lateral movement of the shelf.

6. The barbecue grill assembly of claim 1 wherein the improvement further comprises the shelf being secured to and removable from the frame assembly without additional hardware.

7. The barbecue grill assembly of claim 1 wherein the improvement further comprises the quick release member being a spring member.

8. The barbecue grill assembly of claim 1 wherein the improvement further comprises the shelf having a bottom wall and four side walls and the bottom wall of the shelf being substantially planar.

9. The barbecue grill assembly of claim 8 wherein the improvement further comprises the quick release member depending from one of the four side walls.

10. The barbecue grill assembly of claim 9 wherein the improvement further comprises the shelf having a second quick release member depending from another of the four side walls.

11. The barbecue grill assembly of claim 8 wherein the improvement further comprises the quick release member depending from the bottom wall.

12. The barbecue grill assembly of claim 8 wherein the improvement further comprises at least one of the four sidewalls engaging the at least one lower frame member.

13. The barbecue grill assembly of claim 1 wherein the improvement further comprises the shelf being a wire rack.

14. The barbecue grill assembly of claim 1 wherein the improvement further comprises the quick release member being biased towards the second position.

15. In a barbecue grill assembly comprising a frame assembly formed from a plurality of frame members defining an interior space, the frame assembly adapted to support a cooking chamber, the frame assembly having a lower frame member, the improvement comprising:

a shelf generally positioned within the interior space, the shelf having a transverse member adapted to engage a top surface of the lower frame member, a downturned member adapted to engage an outside surface of the lower frame member, and a quick release member; and, a portion of the quick release member being adapted to move between a first position, wherein the quick release member slidingly engages a portion of an inner wall of the lower frame member and wherein the quick release member allows for detachment of the shelf from the frame assembly, and a second position, wherein the quick release member lockingly engages a generally downwardly facing surface of the lower frame member.

16. The barbecue grill assembly of claim 15 wherein the improvement further comprises:

the shelf has a bottom wall and four side walls and the bottom wall of the shelf is substantially planar;

the transverse member depends from one of the four side walls and the downturned member depends from the transverse member; and, the shelf has a second transverse member and a second downturned member, the second transverse member depending from another of the four side walls and the second downturned member depending from the second transverse member.

17. In a barbecue grill assembly comprising a frame assembly formed from a plurality of frame members defining an interior space, the frame assembly adapted to support a cooking chamber, the frame assembly having a lower frame member with a height, the improvement comprising:

a shelf generally positioned within the interior space, the shelf having a transverse member adapted to engage a top surface of the lower frame member, a downturned member, and a quick release member;

a portion of the quick release member having a detent at a tip of the portion, a distance between the transverse member and the detent being approximately equal to the height of the lower frame member;

the portion being adapted to rotate about a generally horizontal axis between a first position, wherein the quick release member slidingly engages a portion of an inner wall of the lower frame member and wherein the quick release member allows for detachment of the shelf from the frame assembly, and a second position, wherein the detent lockingly engages a generally downwardly facing surface of the lower frame member; and, the downturned member being adapted to engage an outside surface of the lower frame member and the quick release member being adapted to engage an inside surface of the lower frame member, wherein the downturned member and the quick release member resist lateral movement of the shelf.

18. The barbecue grill assembly of claim 17 wherein the improvement further comprises the shelf having a bottom wall and four side walls and the bottom wall of the shelf being substantially planar.

19. The barbecue grill assembly of claim 18 wherein the improvement further comprises the transverse member depending from one of the four side walls and the downturned member depending from the transverse member.

20. The barbecue grill assembly of claim 19 wherein the improvement further comprises the shelf having a second transverse member and a second downturned member, the second transverse member depending from another of the four side walls and the second downturned member depending from the second transverse member.

* * * * *